United States Patent
Li et al.

(10) Patent No.: US 10,588,166 B2
(45) Date of Patent: Mar. 10, 2020

(54) COMMUNICATING CONTROL INFORMATION VIA INTERLEAVED SYMBOLS

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/616,124

(22) Filed: Jun. 7, 2017

(65) Prior Publication Data

US 2018/0054841 A1     Feb. 22, 2018

Related U.S. Application Data

(60) Provisional application No. 62/377,470, filed on Aug. 19, 2016.

(51) Int. Cl.
*H04W 76/11* (2018.01)
*H04L 5/00* (2006.01)
(Continued)

(52) U.S. Cl.
CPC .......... *H04W 76/11* (2018.02); *H04L 5/0007* (2013.01); *H04L 5/0053* (2013.01);
(Continued)

(58) Field of Classification Search
CPC .. H04W 76/021; H04W 76/02; H04L 41/0806
See application file for complete search history.

(56) References Cited

U.S. PATENT DOCUMENTS

2007/0211677 A1* 9/2007 Laroia ................. H04W 76/023
                                                          370/338
2008/0002792 A1* 1/2008 Shalev ................. H03G 3/3078
                                                          375/345
(Continued)

FOREIGN PATENT DOCUMENTS

EP          3057258 A1    8/2016
WO   WO-2014078718 A1    5/2014

OTHER PUBLICATIONS

International Search Report and Written Opinion—PCT/US2017/045605—ISA/EPO—dated Jan. 18, 2018.
(Continued)

*Primary Examiner* — Alex Skripnikov
*Assistant Examiner* — Sharmin Chowdhury
(74) *Attorney, Agent, or Firm* — Loza & Loza, LLP/Qualcomm

(57) ABSTRACT

Various aspects of the disclosure relate to communicating control information via interleaved symbols. For example, symbols of a first handshaking process may be interleaved with symbols of a second handshaking process. In some scenarios, the control information includes request-to-send (RTS) and clear-to-send (CTS) signaling. In some aspects, different tone spacing is used for the control information than is used for data within a subframe. In some aspects, a different cyclic prefix length is used for control information than is used for data within a subframe.

26 Claims, 13 Drawing Sheets

(51) Int. Cl.
*H04W 74/08* (2009.01)
*H04L 12/24* (2006.01)
*H04W 76/10* (2018.01)

(52) U.S. Cl.
CPC ........ *H04L 5/0092* (2013.01); *H04L 41/0806* (2013.01); *H04W 74/0816* (2013.01); *H04W 76/10* (2018.02)

(56) References Cited

U.S. PATENT DOCUMENTS

| | | | | |
|---|---|---|---|---|
| 2009/0249166 | A1* | 10/2009 | Miki | H03M 13/27 714/762 |
| 2011/0222398 | A1* | 9/2011 | Ribeiro | H04W 74/0816 370/230 |
| 2011/0317633 | A1 | 12/2011 | Tan et al. | |
| 2012/0163181 | A1* | 6/2012 | Xue | H04W 52/24 370/241 |
| 2013/0136013 | A1* | 5/2013 | Kneckt | H04W 74/0816 370/252 |
| 2014/0286203 | A1* | 9/2014 | Jindal | H04J 11/0026 370/278 |
| 2015/0117295 | A1* | 4/2015 | Yeh | H04W 76/023 370/312 |
| 2015/0207603 | A1* | 7/2015 | Yie | H04L 5/0048 370/280 |
| 2015/0327288 | A1* | 11/2015 | Park | H04W 52/04 370/329 |
| 2016/0119083 | A1* | 4/2016 | Zhao | H04L 1/0068 375/267 |
| 2016/0381565 | A1* | 12/2016 | Oteri | H04W 16/14 370/328 |
| 2019/0007974 | A1* | 1/2019 | Nguyen | H04W 74/0825 |
| 2019/0124673 | A1* | 4/2019 | Seo | H04W 72/0446 |

OTHER PUBLICATIONS

"Detailed Draft Standard Text Changes to Support DTBS; 1194258x_scan", IEEE Draft; 1194258X_Scan, IEEE-SA, Piscataway, NJ USA, vol. 802.11, Dec. 31, 2014, pp. 3-19, XP068084678, [retrieved on Dec. 31, 2014].

Partial International Search Report—PCT/US2017/045605—ISA/EPO—dated Nov. 13, 2017.

* cited by examiner

COMMUNICATING CONTROL INFORMATION VIA INTERLEAVED SYMBOLS

CROSS-REFERENCE TO RELATED APPLICATIONS

This application claims priority to and the benefit of U.S. Provisional Application Ser. No. 62/377,470, filed on Aug. 19, 2016, the entire content of which is incorporated herein by reference.

INTRODUCTION

Various aspects described herein relate to wireless communication and more particularly, but not exclusively, to communicating control information using interleaved symbols.

Wireless communication networks are widely deployed to provide various communication services such as telephony, video, data, messaging, broadcasts, and so on. Such networks, which are usually multiple access networks, support communication for multiple users by sharing the available network resources.

In some wireless communication networks, a device may communicate with another device by initially sending and receiving control information (e.g., to reserve a wireless communication resource) and then sending data. Gaps may be scheduled between the communication of successive control symbols to, for example, allow for processing of a symbol, facilitate a turn-around time between transmit and receive operations, or accommodate other system design goals. These gaps may increase the overhead associated with the communication of control information. However, it is desirable to keep overhead as low as possible to improve communication performance.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides a method of communication including: obtaining an indication that an interleaved symbol configuration is to be used for communicating control information between an apparatus and another apparatus; and communicating the control information using contiguous interleaved symbols as a result of obtaining the indication.

Another aspect of the disclosure provides an apparatus for communication, including: a memory and a processor coupled to the memory. The processor and the memory are configured to: obtain an indication that an interleaved symbol configuration is to be used for communicating control information between the apparatus and another apparatus; and communicate the control information using contiguous interleaved symbols as a result of obtaining the indication.

Another aspect of the disclosure provides an apparatus configured for communication. The apparatus including: means for obtaining an indication that an interleaved symbol configuration is to be used for communicating control information between the apparatus and another apparatus; and means for communicating the control information using contiguous interleaved symbols as a result of obtaining the indication.

Another aspect of the disclosure provides a non-transitory computer-readable medium storing computer-executable code, including code to: obtain an indication that an interleaved symbol configuration is to be used for communicating control information between an apparatus and another apparatus; and communicate the control information using contiguous interleaved symbols as a result of obtaining the indication.

In some aspects, the disclosure provides a method of communication including: determining that an interleaved symbol configuration is to be used for communicating control information between a first apparatus and a second apparatus; and communicating an indication as a result of the determination, wherein the indication indicates that the interleaved symbol configuration is to be used for communicating control information between the first apparatus and the second apparatus.

Another aspect of the disclosure provides an apparatus for communication, including: a memory and a processor coupled to the memory. The processor and the memory are configured to: determine that an interleaved symbol configuration is to be used for communicating control information between a first apparatus and a second apparatus; and communicate an indication as a result of the determination, wherein the indication indicates that the interleaved symbol configuration is to be used for communicating control information between the first apparatus and the second apparatus.

Another aspect of the disclosure provides an apparatus configured for communication. The apparatus including: means for determining that an interleaved symbol configuration is to be used for communicating control information between a first apparatus and a second apparatus; and means for communicating an indication as a result of the determination, wherein the indication indicates that the interleaved symbol configuration is to be used for communicating control information between the first apparatus and the second apparatus.

Another aspect of the disclosure provides a non-transitory computer-readable medium storing computer-executable code, including code to: determine that an interleaved symbol configuration is to be used for communicating control information between a first apparatus and a second apparatus; and communicate an indication as a result of the determination, wherein the indication indicates that the interleaved symbol configuration is to be used for communicating control information between the first apparatus and the second apparatus.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
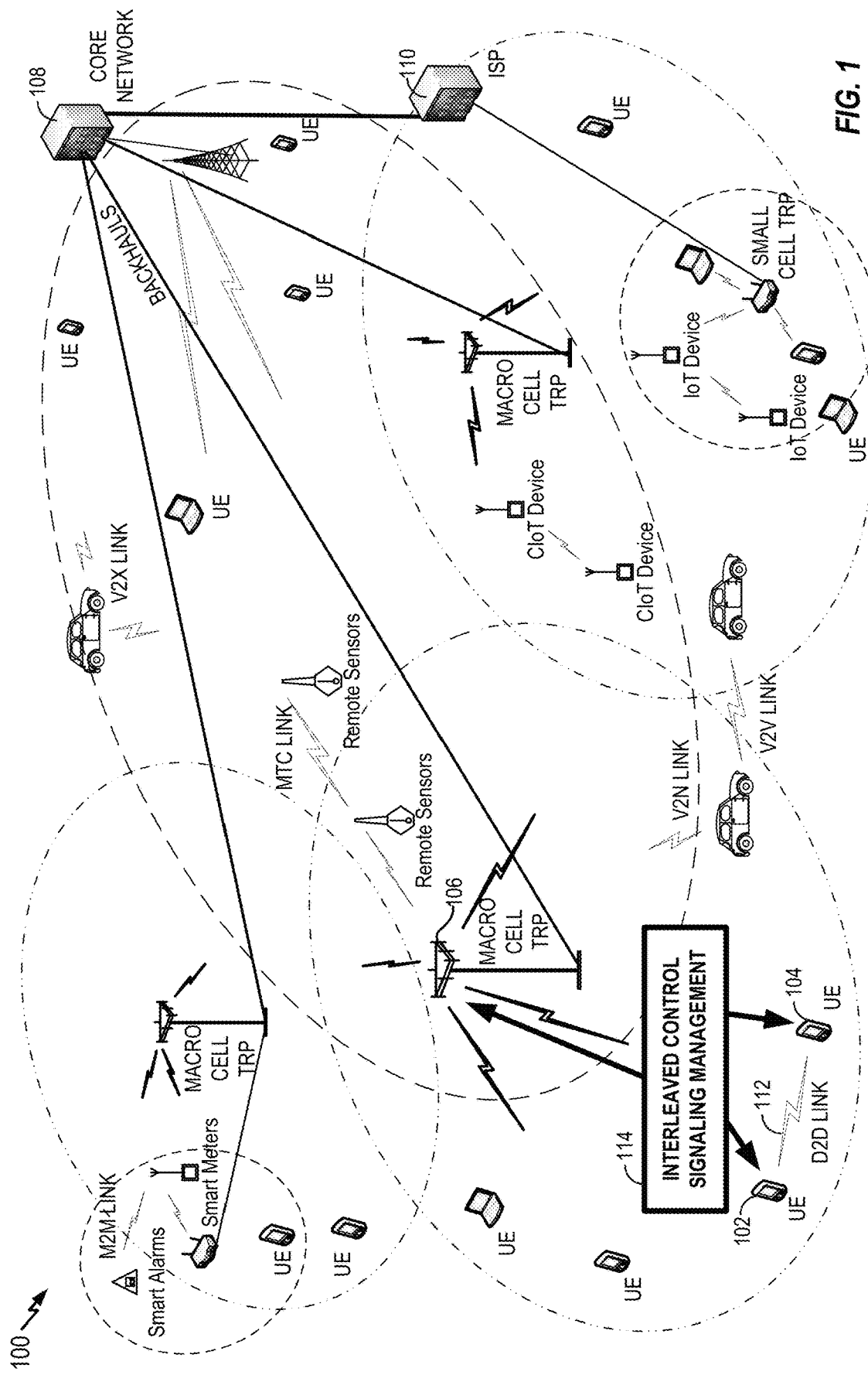
FIG. 1 is a diagram of an example communication system in which aspects of the disclosure may be used.

Various aspects of the disclosure relate to communicating control information via interleaved symbols. For example, symbols of a first handshaking process may be interleaved with symbols of a second handshaking process. In some scenarios, the control information includes request-to-send (RTS) and clear-to-send (CTS) signaling. In some aspects, an associated frame structure may specify different characteristics for signaling of the control information than is specified for transmission or reception of data. In some aspects, the characteristics include orthogonal frequency division multiplexing (OFDM) characteristics such as tone spacing or cyclic prefix length. Thus, in some cases, the tone spacing specified for control signaling may be different from the tone spacing specified for data transmission and reception. Also, in some cases, the cyclic prefix length specified for control signaling may be different from the cyclic prefix length specified for data transmission and reception. These characteristics may be generally referred to as numerology herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other UEs via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, and so on). In addition, the UEs 102 and 104 may communicate with each other directedly via a device-to-device (D2D) link 112.

In accordance with the teachings herein, the UEs 102 and 104 may use interleaved control signaling over the D2D link 112. For example, control symbols of a first handshaking process may be interleaved with control symbols of a second handshaking process. Accordingly, each of the UE 102, the UE 104, and the TRP 106 include interleaved control signaling management 114 for controlling when and how the interleaved control symbols are communicated by the UE 102 and the UE 104 over the D2D link 112.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Figure 2:
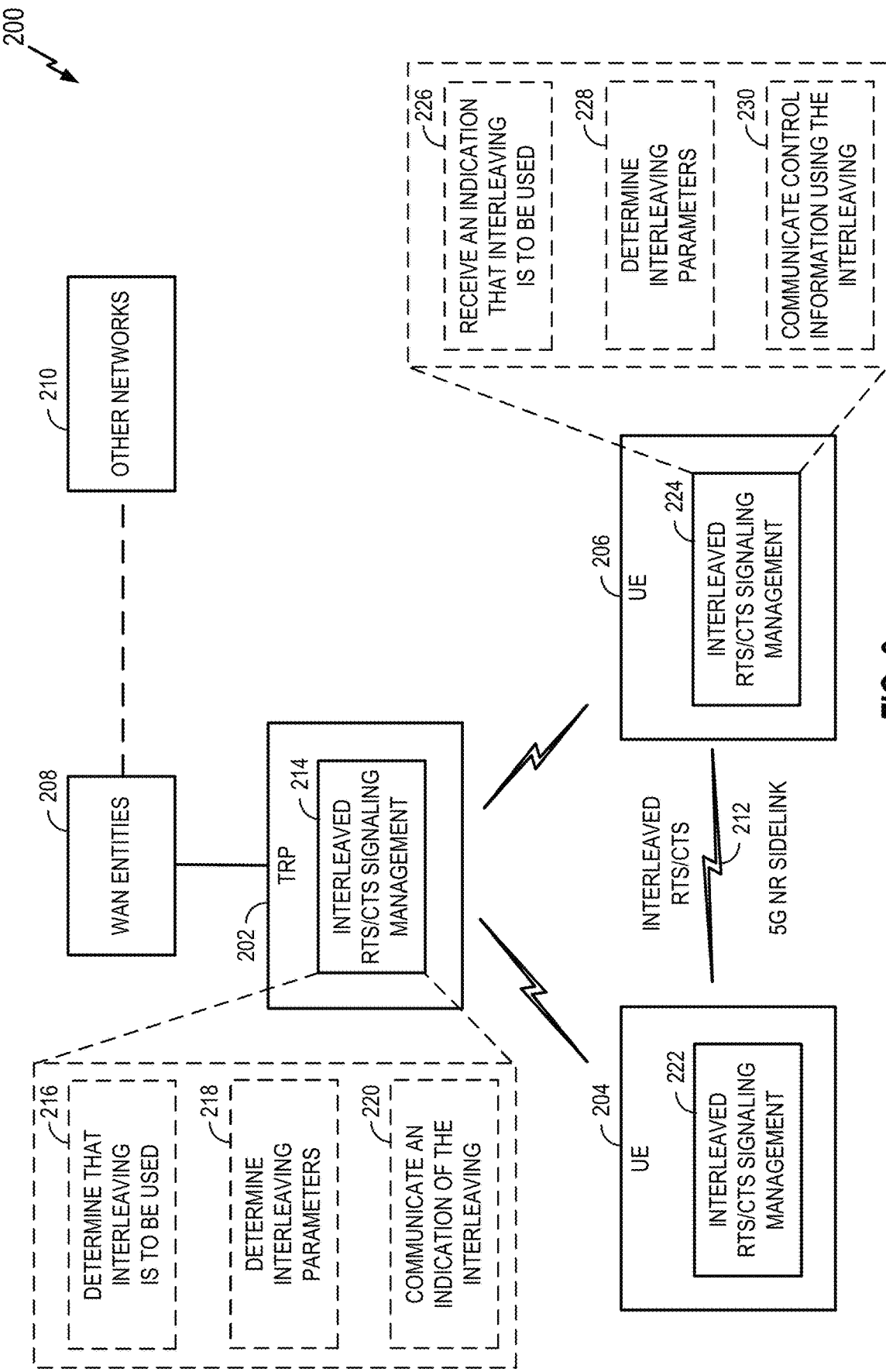
FIG. 2 is a block diagram of another example communication system in which aspects of the disclosure may be used.

FIG. 2 illustrates another example of a wireless communication system 200 where a transmit receiver point (TRP) 202 serves one or more UEs in a wide area network. In this example, a first UE 204 and a second UE 206 may communicate with the TRP 202 via wireless communication resources (e.g., a licensed spectrum) managed by the TRP 202. Thus, the UEs 204 and 206 may access other communication devices of a wide area network (e.g., via the TRP 202 or other wide area network (WAN) entities 208) or access communication devices in other networks 210. To reduce the complexity of FIG. 2, only a single TRP and two UEs are shown. In practice, a wireless communication system may include more of these devices. In some implementations, the TRP 202, the first UE 204, and the second UE 206 may correspond to the TRP 106, the UE 102, and the UE 104 of FIG. 1, respectively.

The UEs 204 and 206 also may communicate via a direct link 212. In some cases, this communication may use the wireless communication resources managed by the TRP 202. For example, the direct link communication between the UEs 204 and 206 may use a licensed spectrum. In some implementations (e.g., 5G NR), the direct link 212 may be referred to as a sidelink. The resources for the sidelink may be allocated by the TRP 202, allocated based on a preconfiguration, or allocated in some other way. In some implementations, the sidelinks for different pairs of UEs are frequency division multiplexed on the resource.

The TRP 202 may include functionality for interleaved RTS/CTS signaling management 214. As discussed in more detail below, the interleaved RTS/CTS signaling management 214 may include functionality to determine that interleaving is to be used 216, determine (e.g., select) the interleaving parameters 218 (e.g., the symbols used, the numerology used, etc.), and communicate an indication of the interleaving 220. Alternatively, the TRP 202 could simply tell the UEs 204 and 206 which subframes can be used for sidelink communication.

The UE 204 and the UE 206 include functionality for interleaved RTS/CTS signaling management 222 and 224, respectively. As discussed in more detail below, the interleaved RTS/CTS signaling management 224 may include functionality to receive an indication that interleaving is to be used 226, determine interleaving parameters 228 (e.g., the symbols used, the numerology used, etc.), and communicate control information using the interleaving 230. Alternatively, in cases where the TRP 202 simply tells the UEs 204 and 206 which subframes can be used for sidelink communication, one or both of the UEs 204 and 206 may include functionality to determine that interleaving is to be used, to select the interleaving parameters, and communicate an indication of the interleaving. The interleaved RTS/CTS signaling management 222 may include similar functionality (not shown) as the RTS/CTS signaling management 224 discussed above.

Example Sidelink Frame Structure

A unicast sidelink is between two devices. One device is designated as the primary device and the other device is designated as the secondary device. The primary device has priority for sidelink access. For example, with reference to FIG. 2, the primary device may be the UE 204 and the secondary device may be the UE 206.

Figure 3:
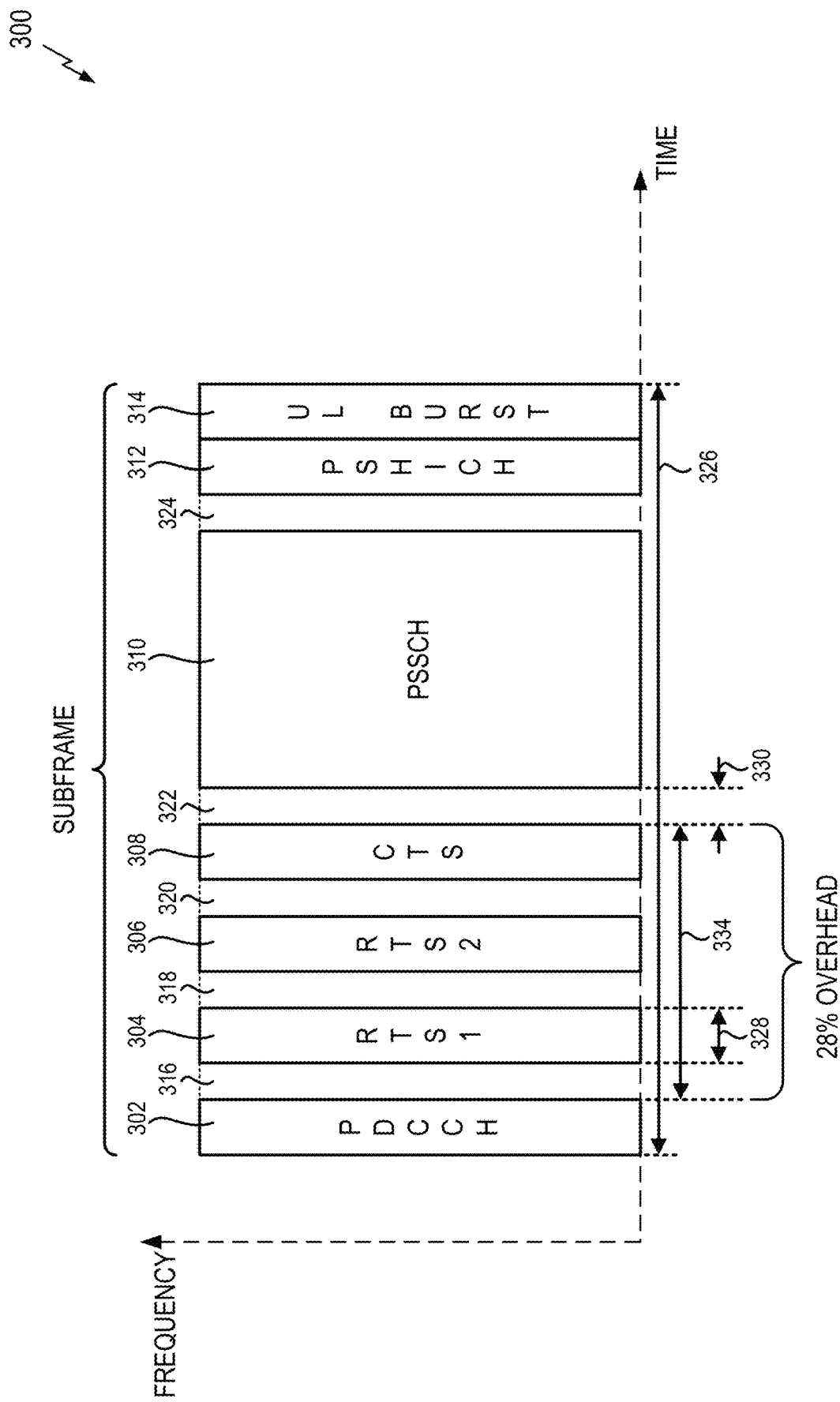
FIG. 3 is a diagram of an example sidelink frame structure.

FIG. 3 illustrates an example of a sidelink frame structure that may be used for unicast communication between primary and secondary devices. The example subframe 300 in FIG. 3 may have a subframe period 326 and may include a number of OFDM symbols (e.g., an OFDM symbol 304), where each OFDM symbol has the same symbol period (e.g., a symbol period 328). For example, in the subframe 300, an OFDM symbol 302 includes a physical downlink control channel (PDCCH), the OFDM symbol 304 includes a first RTS (RTS1), an OFDM symbol 306 includes a second RTS (RTS2), an OFDM symbol 308 includes a CTS, OFDM symbols 310 include a physical sidelink shared channel (PSSCH), an OFDM symbol 312 includes a physical sidelink HARQ indicator channel (PSHICH), and an OFDM symbol 314 includes an uplink (UL) burst. In an example implementation, the subframe period 326 may be 500 μs and the subframe 300 may include a total of 16 OFDM symbols. In this example, the OFDM symbols 310 may include 7.5 contiguous OFDM symbols.

The PDCCH may include a generic grant for sidelink or a link-specific grant. The PDCCH may frequency division multiplex (FDM) multiple sidelinks as well as the uplink within a single subframe. The first RTS (referred to as RTS1 in FIG. 3) is sent by the primary device of the sidelink. Thus, the first RTS is sent if the primary device has data to transmit. The second RTS (referred to as RTS2 in FIG. 3) may be sent by the secondary device of the sidelink if the primary device did not send the first RTS. Thus, the second RTS is sent if the secondary device has data to transmit and the primary device does not.

Each RTS may include a destination identifier (ID), the duration of transmission, and a Reference Signal (RS) to enable channel measurement as well as receive (Rx) yielding for other links. The CTS may be sent by the destination device if it is not Rx yielding. For example, the secondary device may send CTS in response to the first RTS. Conversely, the primary device may send CTS in response to the second RTS. The CTS may include a source ID, the duration of transmission, the signal-to-interference-plus-noise ratio (SINR) of the RS received from the source, and a Reference Signal to enable transmit (Tx) yielding.

The PSSCH may be a sidelink regular burst (e.g., for data). The associated modulation and coding scheme (MCS) may be chosen based on CTS channel quality indicator (CQI) feedback. The PSHICH may be a sidelink acknowledged/not acknowledged (Ack/Nack) hybrid-automatic repeat request (HARQ) indicator from the destination. The UL common burst may be for feedback (e.g., control signaling) or other information from the destination.

In an example implementation, the subframe 300 may include one or more gaps, such as the gaps 316, 318, 320, 322, and 324, where each gap has the same gap period (e.g., a gap period 330). For example, each gap period (e.g., the gap period 330) may be half of a symbol period (e.g., half the symbol period 328).

It should be noted that the OFDM symbol 304 including the first RTS, the OFDM symbol 306 including the second RTS, the OFDM symbol 308 including the CTS, and the gaps 316, 318, and 320 configured for the RTS/CTS handshaking involve a relatively large overhead for nominal transmit time intervals (TTIs). For example, the RTS/CTS handshaking overhead period 334 indicated in FIG. 3 may include 4.5 OFDM symbols of the 16 OFDM symbols in the subframe 300. Therefore, approximately 28% of overhead (e.g., (4.5 OFDM symbols)/(16 OFDM symbols)× 100≈28%) is used for the RTS/CTS handshaking in the example subframe 300. It can be appreciated that such overhead for the RTS/CTS handshaking may be even larger for shorter TTIs (e.g., in an implementation where the subframe period 326 is reduced and/or includes less than 16 OFDM symbols).

Different Numerology for Control and Data

The disclosure relates in some aspects to a frame structure that specifies different characteristics for control versus data. For example, RTS/CTS can use different numerology from data transmission. This numerology may include, for example, tone spacing, cyclic prefix length, or other characteristics. With respect to the sidelink, RTS/CTS can use larger (e.g., double, triple, etc.) tone spacing, if practical, to reduce handshaking overhead.

Figure 4:
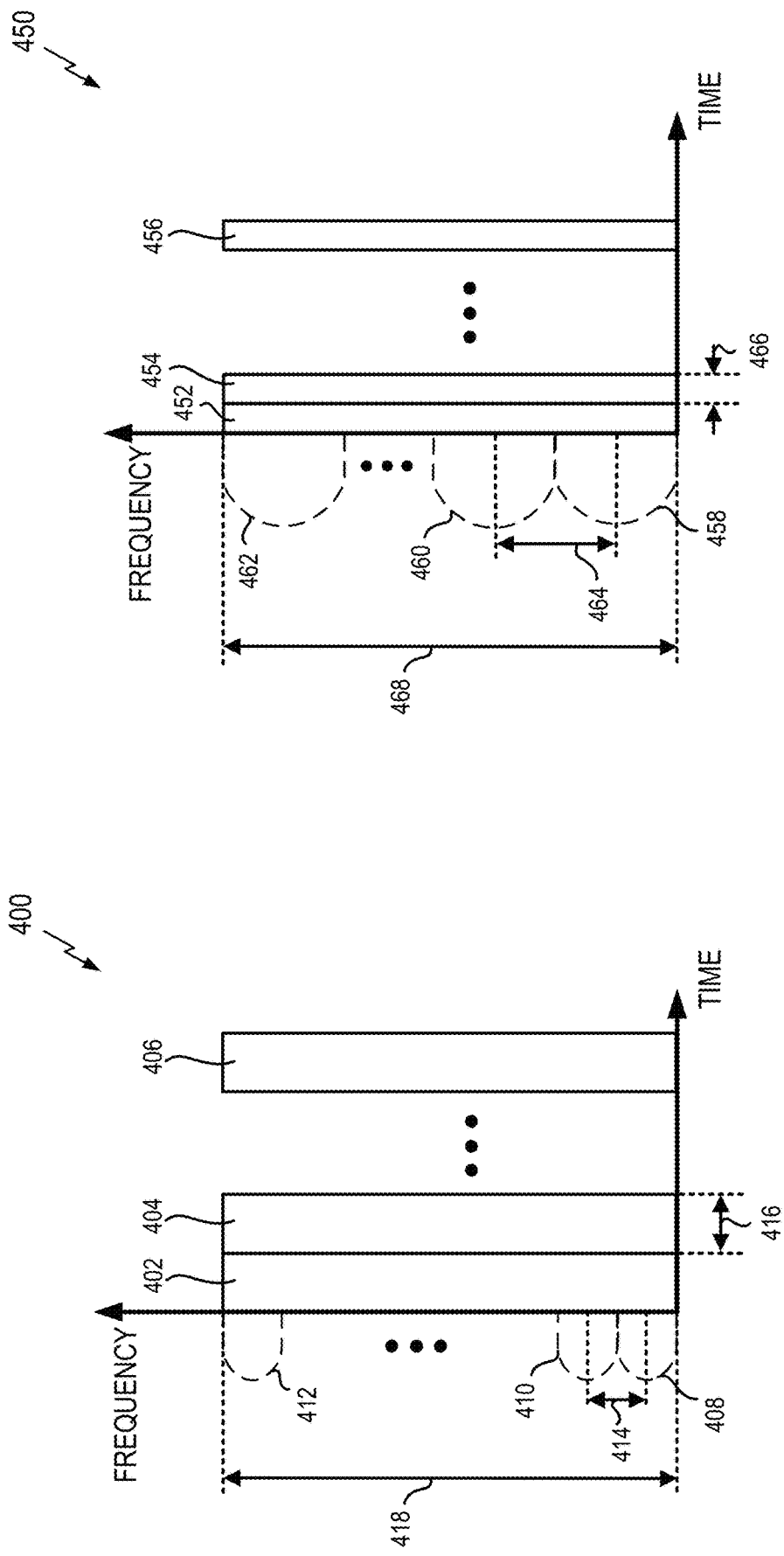
FIG. 4 is a diagram illustrating the relationship between the tone spacing of tones in an OFDM channel and an OFDM symbol period.

FIG. 4 illustrates a relationship between the tone spacing (also referred to as subcarrier spacing or subchannel spacing) of tones (also referred to as subcarriers or subchannels) in an OFDM channel and an OFDM symbol period. As shown in the configuration 400 of FIG. 4, the bandwidth 418 of an OFDM channel may be configured as a number of tones that are spaced apart by a tone spacing 414 (e.g., 15 kHz). For example, first information may be carried via a first tone 408, second information may be carried via a second tone 410, and n$^{th}$ information may be carried via an n$^{th}$ tone 412. As further shown in the configuration 400 of FIG. 4, OFDM symbols 402, 404, and 406 implementing the tones may each have the same symbol period 416. It should be understood that the relationship between the tone spacing 414 and the symbol period 416 is such that the tone spacing 414 is approximately equal to the reciprocal of the symbol period 416. Therefore, for example, an increase of the tone spacing 414 results in a decrease of the symbol period 416. This is illustrated is the example configuration 450 of FIG. 4.

As shown in the configuration 450 of FIG. 4, the bandwidth 468 of an OFDM channel may be configured as a number of wider bandwidth tones that are spaced apart by a larger tone spacing 464. For example, first information may be carried via a first tone 458, second information may be carried via a second tone 460, and m$^{th}$ information may be carried via an m$^{th}$ tone 462. The bandwidth 468 may be equal to the bandwidth 418, and the tone spacing 464 (e.g., 30 kHz) may be double the tone spacing 414 (e.g., 15 kHz) of the configuration 400. Accordingly, in this example, the OFDM symbols 452, 454, and 456 may each have the same symbol period 466, where the symbol period 466 is half the duration of the symbol period 416. If the bandwidths 418 and 468 are equal, one tradeoff here is that since the tones 458, 460, etc., have a wider bandwidth (and, hence, can carry more information bits) in the configuration 450 as compared to the configuration 400, fewer tones (e.g., half the number of tones) for carrying information are allocated within the bandwidth 468 than in the bandwidth 418.

Figure 5:
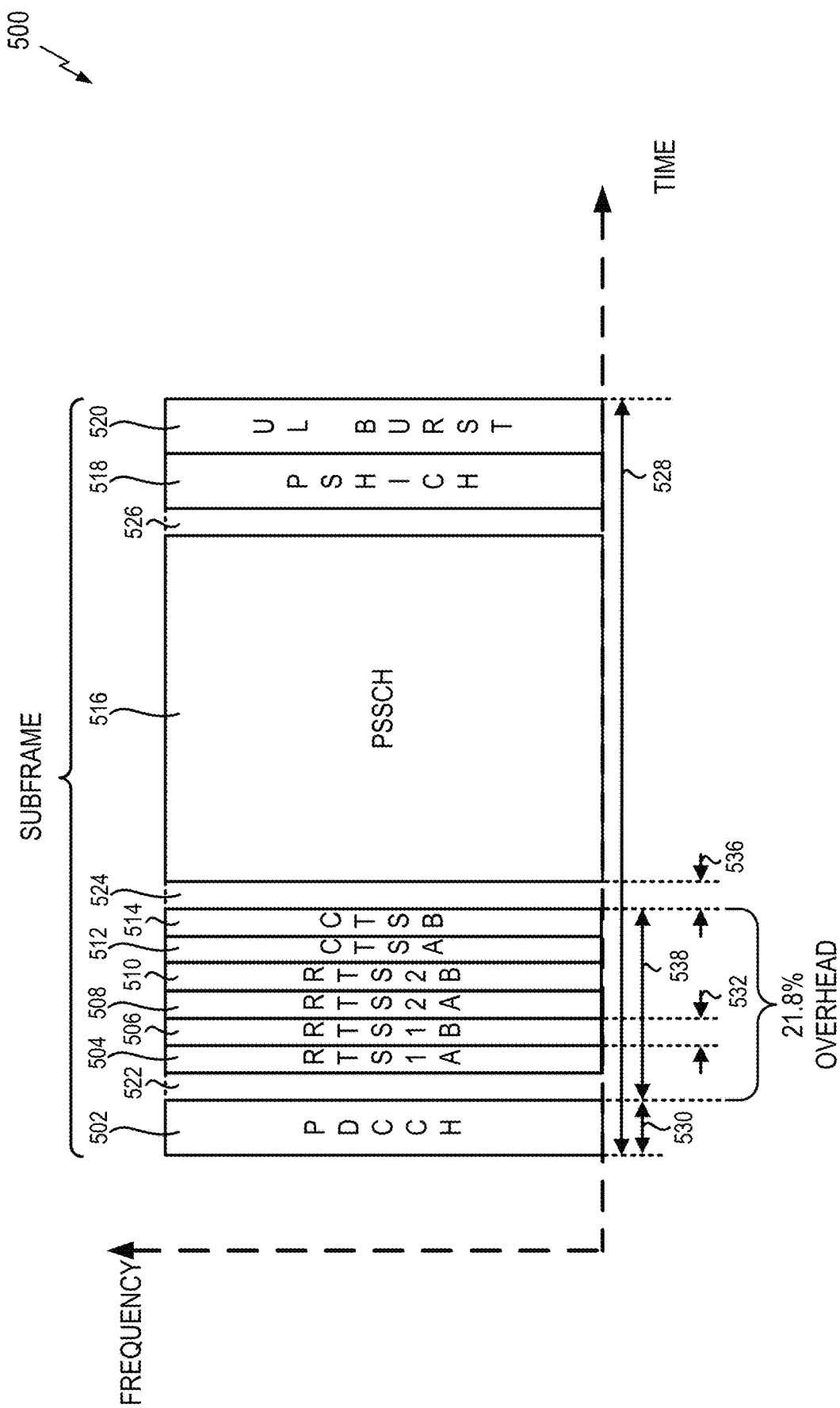
FIG. 5 is a diagram of an example sidelink frame structure in accordance with some aspects of the disclosure.

FIG. 5 illustrates an example of a sidelink frame structure that may be used for unicast communication between primary and secondary devices where a larger tone spacing is used for RTS/CTS relative to the tone spacing used for other signals (e.g., data) in the subframe. The example subframe 500 in FIG. 5 may have a subframe period 528 and may include a number of OFDM symbols (e.g., OFDM symbols 502, 518, and 520) that have the same full symbol period (e.g., a full OFDM symbol period 530). In the subframe 500, the OFDM symbol 502 includes a PDCCH, OFDM symbols 516 include a PSSCH, the OFDM symbol 518 includes a PSHICH, and the OFDM symbol 520 includes a UL burst. The subframe 500 may include gaps 522, 524, and 526, where each gap has the same gap period (e.g., a gap period 536). For example, each gap period (e.g., the gap period 536) may be half of a symbol period (e.g., half the full OFDM symbol period 530). In an example implementation, the subframe period 528 (which may also be referred to as a transmission time interval, TTI) may be 500 μs.

In the example of FIG. 5, the tone spacing used for RTS/CTS is double the tone spacing used for other signals (e.g., the PDDCH, PSSCH, PSHICH, UL burst) in the subframe 500. Therefore, in the time domain, the symbol period of each OFDM symbol for RTS and CTS is halved to produce two shorter symbols in accordance with the description of FIG. 4. For example, RTS and CTS may use a tone spacing of 30 kHz while the other signals of the subframe 500 may use a tone spacing of 15 kHz. Accordingly, as shown in FIG. 5, the subframe 500 includes a short symbol 504 for a first RTS "A" (referred to as RTS1A in FIG. 5), a short symbol 506 for a first RTS "B" (referred to as RTS1B in FIG. 5), a short symbol 508 for a second RTS "A" (referred to as RTS2A in FIG. 5), a short symbol 510 for a second RTS "B" (referred to as RTS2B in FIG. 5), a short symbol 512 for a CTS "A" (referred to as CTSA in FIG. 5), and a shorter symbol 514 for a CTS "B" (referred to as CTSB in FIG. 5). For example, each of the short symbols 504, 506, 508, 510, 512, and 514 may have the same symbol period (e.g., a symbol period 532) that is half the full OFDM symbol period 530. Here, two short symbols are used for each RTS and CTS to carry the same number of information bits as the full width RTS and CTS symbols (e.g., as shown in FIG. 4) or to carry bits for two different handshaking processes (discussed below).

In some implementations, numerology adaptation is controlled by a TRP (or an eNB, etc.) in a larger time scale via radio resource control (RRC) signaling or in a smaller time scale via PDCCH, or both. For example, RRC signaling may be on the order of seconds while PDCCH signaling may be on the order of every frame.

Numerology adaptation could be controlled in other ways. For example, a pair of UEs could negotiate to use numerology adaptation and/or negotiate to use a particular numerology adaptation configuration. As another example, a UE could be preconfigured to use a particular numerology adaptation configuration.

Two example implementations are described below in conjunction with FIGS. 5 and 6. It should be appreciated based on the teachings herein that other implementations may be used as well.

Interleaving RTS/CTS

The disclosure relates in some aspects to a first example implementation that reduces RTS/CTS handshaking overhead in a subframe by interleaving RTS/CTS symbols. In some scenarios, the first example implementation may use a larger tone spacing for RTS/CTS relative to the tone spacing used for other signals in the subframe and interleave the resulting shortened RTS/CTS symbols. In the example of FIG. 3 discussed above, each of the previously described gaps 316, 318, 320, and 322 in the RTS/CTS handshaking overhead period 334 reserves a processing time and/or turnaround time that is needed due to half duplex operation. In accordance with the teachings herein, RTS/CTS may use a larger tone spacing to break a full OFDM symbol into multiple short symbols. This splits us the handshaking process (RTS/CTS) of FIG. 3 into multiple handshaking processes (two in the example of FIG. 5). By interleaving these handshaking processes, the period of time for a short symbol of one handshaking process can be used for the processing time and/or turnaround time for another handshaking. Consequently, the gap (due to half-duplex) between RTS and CTS (shown in FIG. 3) may be eliminated, resulting in a reduction of the RTS/CTS handshaking overhead.

Referring to the example of FIG. 5, the short symbols 504, 508, and 512 may be used for a first handshaking process (e.g., RTS1A/RTS2A/CTSA) between a pair of UEs (e.g., a primary UE and a secondary UE), while the short symbols 506, 510, and 514 may be used for a second handshaking process (e.g., RTS1B/RTS2B/CTSB) between the UEs. As shown in FIG. 5, the first handshaking process (e.g., RTS1A/RTS2A/CTSA) is interleaved with the second handshaking process (e.g., RTS1B/RTS2B/CTSB). In some aspects, the short symbols 504, 506, 508, 510, 512, and 514 in the subframe 500 may be contiguous.

In some aspects, the first handshaking process RTS1A/RTS2A/CTSA may use the set of short symbols 506, 510, and 514 of the second handshaking process RTS1B/RTS2B/CTSB as processing and/or switching gaps, while the second handshaking process RTS1B/RTS2B/CTSB may use the set of short symbols 508 and 512 of the handshaking process RTS1A/RTS2A/CTSA as processing and/or switching gaps. For example, when a primary UE transmits the first RTS "A" in the short symbol 504, the secondary UE may process the first RTS "A" during the time period for the short symbol 506 for the first RTS "B" (e.g., to determine whether the secondary UE can transmit the second RTS "A"), and so on. As another example, when the primary UE transmits the first RTS "B" in the short symbol 506, the secondary UE may process the first RTS "B" during the time period for the short symbol 508 for the second RTS "A", and so on.

It should be appreciated that since the RTS/CTS processing time gaps (previously described with reference to FIG. 3) are eliminated in the implementation of FIG. 5, the RTS/CTS handshaking overhead period 538 is reduced relative to the RTS/CTS handshaking overhead period 334 in FIG. 3. For example, the RTS/CTS handshaking overhead period 538 may include the equivalent of 3.5 OFDM symbols of the 16 OFDM symbols in the subframe 500. Therefore, approximately 21.8% of overhead (e.g., (3.5 OFDM symbols)/(16 OFDM symbols)×100≈21.8%) is used for the RTS/CTS handshaking in the example subframe 500.

Other tone spacings may be used in other implementations. For example, for triple tone spacing, RTS and CTS may use a 45 kHz tone spacing while the other components of the subframe use a 15 kHz tone spacing. This implementation could then use three interleaved handshaking processes: RTS1A/RTS2A/CTSA, RTS1B/RTS2B/CTSB, and RTS1C/RTS2C/CTSC.

The teachings herein may be applicable to multiple sidelinks. For example, short symbols similar to symbols 504, 508, and 512 may be used for a first handshaking process (e.g., similar to RTS1A/RTS2A/CTSA) between a first group of UEs (e.g., a primary UE_A and a secondary UE_A), while short symbols similar to the symbols 506, 510, and 514 may be used for a second handshaking process (e.g., similar to RTS1B/RTS2B/CTSB) between a second group of UEs (e.g., a primary UE_B and a secondary UE_B). Again (e.g., as in FIG. 5), the handshaking process (e.g., RTS1A/RTS2A/CTSA) between the first group of UEs is interleaved with the handshaking process (e.g., RTS1B/RTS2B/CTSB) between the second group of UEs.

In implementations where a TRP (or an eNB, etc.) controls the interleaving, the interleaving may be controlled in a larger time scale via radio resource control (RRC) signaling or in a smaller time scale via PDCCH, or both. For example, RRC signaling may specify the interleaving to be used for one second or more, while PDCCH signaling may be used to specify the interleaving to be used for a particular frame or a particular set of frames.

Interleaving could be controlled in other ways. For example, a pair of UEs could negotiate to use interleaving and/or negotiate to use a particular interleaving configuration. As another example, a UE could be preconfigured to use a particular interleaving configuration.

Variable Numerology

The disclosure relates in some aspects to a second example implementation that uses a larger tone spacing (e.g., irrespective of interleaving). The use of a larger tone spacing may be triggered based on one or more factors. In some aspects, the factors may relate to the quantity of resources that are needed. The tone spacing could depend on the number of UEs using a sidelink (e.g., under a given TRP), the MCS used (e.g., 16QAM versus 64QAM), some other factors, or some combination of these factors. For example, if a smaller quantity of resources are needed for sidelink communication (e.g., below a threshold quantity), the UEs can be frequency division multiplexed in RTS/CTS with a larger tone spacing to conserve resources and/or to provide a faster RTS/CTS turn-around. As another example, if there are a smaller number of sidelink UEs (e.g., below a threshold quantity), the UEs can be frequency division multiplexed in RTS/CTS with a larger tone spacing. As yet another example, if there are a smaller number of UEs (e.g., below a threshold quantity) that use a higher order MCS (e.g., a threshold MCS), the UEs can be frequency division multiplexed in RTS/CTS with a larger tone spacing.

Figure 6:
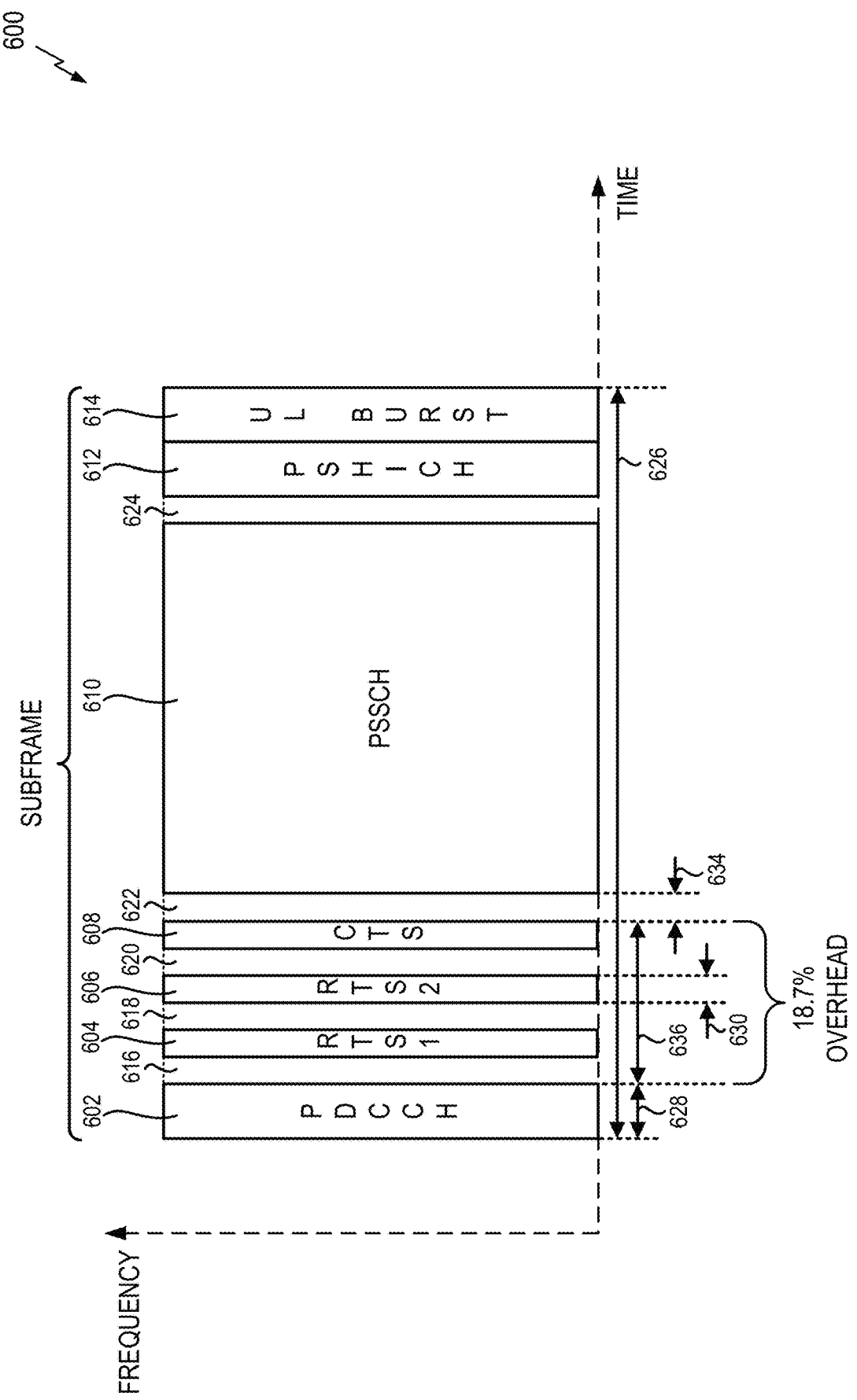
FIG. 6 is a diagram of another example sidelink frame structure in accordance with some aspects of the disclosure.

FIG. 6 illustrates an example subframe 600 for the second implementation. The example subframe 600 may have a subframe period 626 and may include a number of OFDM symbols (e.g., OFDM symbols 602, 612, and 614) that have the same full symbol period (e.g., a full OFDM symbol period 628). For example, in the subframe 600, the OFDM symbol 602 includes a PDCCH, OFDM symbols 610 include a PSSCH, the OFDM symbol 612 includes a PSHICH, and the OFDM symbol 614 includes a UL burst. For example, the subframe 600 may include gaps 616, 618, 620, 622, and 624, where each gap has the same gap period (e.g., a gap period 634). For example, each gap period (e.g., the gap period 634) may be half of an OFDM symbol period (e.g., half the full OFDM symbol period 628). In an example implementation, the subframe period 626 (also referred to as a TTI) may be 600 µs. In this example, OFDM symbols 610 may include 9 contiguous OFDM symbols.

In the example subframe 600, RTS and CTS use a 30 kHz tone spacing while the other components of the subframe 600 use a 15 kHz tone spacing. As a result, the OFDM symbols for RTS/CTS are shortened to be half the length of the other symbols in the time domain. As shown in FIG. 6, the subframe 600 includes a short symbol 604 for a first RTS (referred to as RTS1 in FIG. 6), a short symbol 606 for a second RTS (referred to as RTS2 in FIG. 6), and a short symbol 608 for a CTS. For example, each of the short symbols 604, 606, and 608 may have a symbol period 630 that is half the full symbol period 628. Therefore, the entire RTS/CTS handshaking process is shortened.

It can be appreciated that since the OFDM symbols for the RTS/CTS handshaking are each reduced to a shorter symbol period, the RTS/CTS handshaking overhead period 636 is reduced relative to the RTS/CTS handshaking overhead period 334 in FIG. 3. For example, the RTS/CTS handshaking overhead period 636 may include the equivalent of 3 OFDM symbols of the 16 OFDM symbols in the subframe 600. Therefore, approximately 18.7% of overhead (e.g., (3 OFDM symbols)/(16 OFDM symbols)×100≈18.7%) is used for the RTS/CTS handshaking in the example subframe 600.

First Example Apparatus

Figure 7:
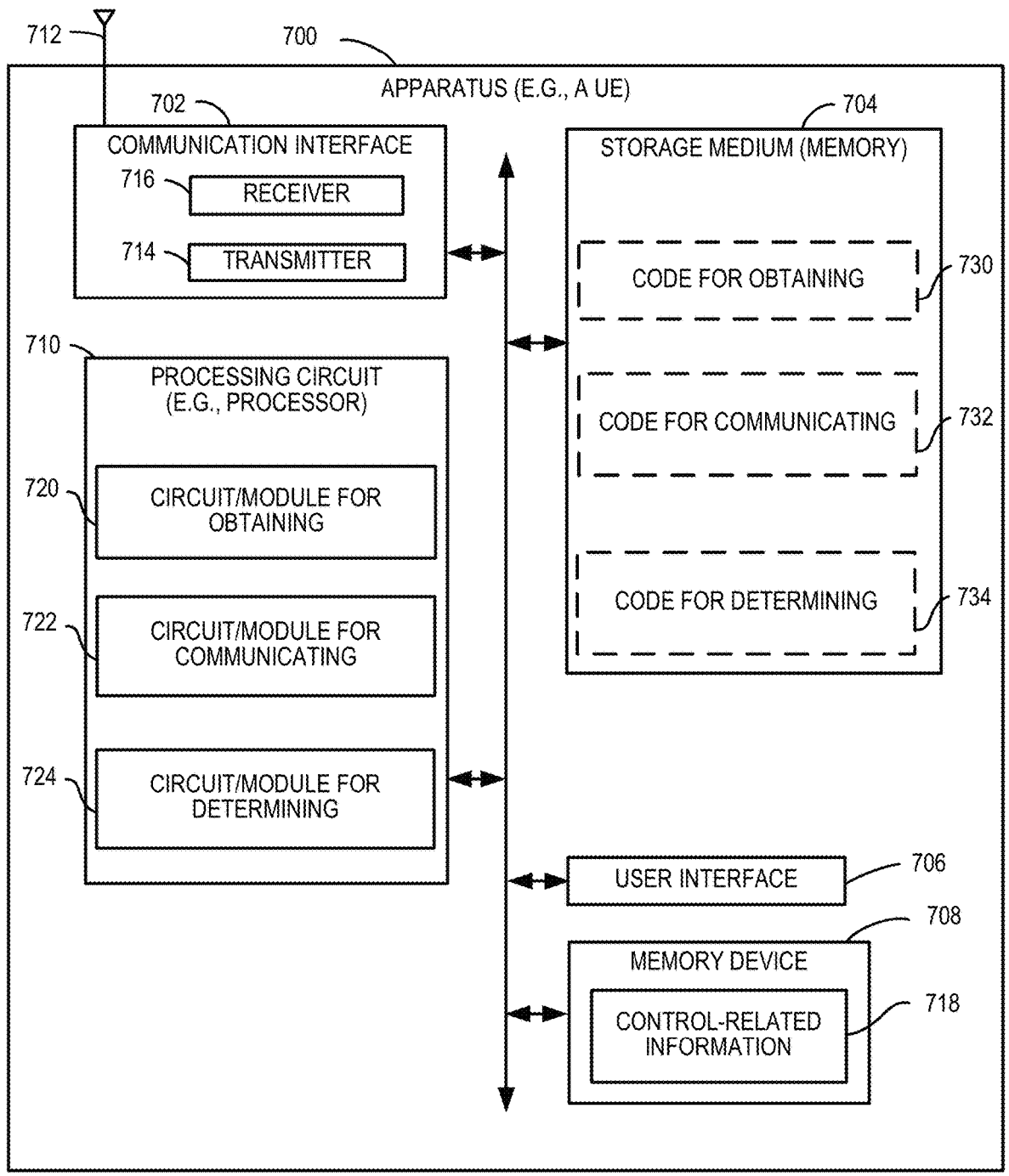
FIG. 7 is a block diagram illustrating an example hardware implementation for an apparatus (e.g., an electronic device) that can support interleaved signaling and/or different numerologies in accordance with some aspects of the disclosure.

FIG. 7 illustrates a block diagram of an example hardware implementation of an apparatus 700 configured to communicate (e.g., using interleaving) according to one or more aspects of the disclosure. The apparatus 700 could embody or be implemented within a UE, a transmit receive point (TRP), an access point, or some other type of device that supports adaptive frame characteristics as taught herein. In various implementations, the apparatus 700 could embody or be implemented within an access terminal, a base station, or some other type of device. In various implementations, the apparatus 700 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 700 includes a communication interface 702 (e.g., at least one transceiver), a storage medium 704, a user interface 706, a memory device 708, and a processing circuit 710 (e.g., at least one processor). These components can be coupled to and/or placed in electrical communication with one another via a signaling bus or other suitable component, represented generally by the connection lines in FIG. 7. The signaling bus may include any number of interconnecting buses and bridges depending on the specific application of the processing circuit 710 and the overall design constraints. The signaling bus links together various circuits such that each of the communication interface 702, the storage medium 704, the user interface 706, and the memory device 708 are coupled to and/or in electrical communication with the processing circuit 710. The signaling bus may also link various other circuits (not shown) such as timing sources, peripherals, voltage regulators, and power management circuits, which are well known in the art, and therefore, will not be described any further.

The communication interface 702 may be adapted to facilitate wireless communication of the apparatus 700. For example, the communication interface 702 may include circuitry and/or programming adapted to facilitate the communication of information bi-directionally with respect to one or more communication devices in a network. Thus, in some implementations, the communication interface 702 may be coupled to one or more antennas 712 for wireless communication within a wireless communication system. In some implementations, the communication interface 702 may be configured for wire-based communication. For example, the communication interface 702 could be a bus interface, a send/receive interface, or some other type of signal interface including drivers, buffers, or other circuitry for outputting and/or obtaining signals (e.g., outputting signal from and/or receiving signals into an integrated circuit). The communication interface 702 can be configured with one or more standalone receivers and/or transmitters, as well as one or more transceivers. In the illustrated example, the communication interface 702 includes a transmitter 714 and a receiver 716.

The memory device 708 may represent one or more memory devices. As indicated, the memory device 708 may maintain control-related information 718 along with other information used by the apparatus 700. In some implementations, the memory device 708 and the storage medium 704 are implemented as a common memory component. The memory device 708 may also be used for storing data that is manipulated by the processing circuit 710 or some other component of the apparatus 700.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 710 when executing programming. The storage medium 704 may be any available media that can be accessed by a general purpose or special purpose processor, including portable or fixed storage devices, optical storage devices, and various other mediums capable of storing, containing or carrying programming.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Programming stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols. In some aspects, the storage medium 704 may include a non-transitory computer-readable medium storing computer-executable code, including code to perform the functionality described herein.

The processing circuit 710 is generally adapted for processing, including the execution of such programming stored on the storage medium 704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming Examples of the processing circuit 710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. For example, the processing circuit 710 may be configured to perform any of the steps, functions, and/or processes described with respect to FIGS. 1-6 and 8-10. As used herein, the term "adapted" in relation to the processing circuit 710 may refer to the processing circuit 710 being one or more of configured, used, implemented, and/or programmed to perform a particular process, function, operation and/or routine according to various features described herein.

The processing circuit 710 may be a specialized processor, such as an application specific integrated circuit (ASIC) that serves as a means for (e.g., structure for) carrying out any one of the operations described in conjunction with FIGS. 1-6 and 8-10. The processing circuit 710 may serve as one example of a means for transmitting and/or a means for receiving. In various implementations, the processing circuit 710 may incorporate the functionality of the UE 206 (e.g., the interleaved RTS/CTS signaling management 224) of FIG. 2.

According to at least one example of the apparatus 700, the processing circuit 710 may include one or more of a circuit/module for obtaining 720, a circuit/module for communicating 722, or a circuit/module for determining 724. In various implementations, the circuit/module for obtaining 720, the circuit/module for communicating 722, or the circuit/module for determining 724 may correspond, at least in part, to the functionality of the UE 206 (e.g., the interleaved RTS/CTS signaling management 224) of FIG. 2.

As mentioned above, programming stored by the storage medium 704, when executed by the processing circuit 710, causes the processing circuit 710 to perform one or more of the various functions and/or process operations described herein. For example, the programming may cause the processing circuit 710 to perform the various functions, steps, and/or processes described herein with respect to FIGS. 1-6 and 8-10 in various implementations. As shown in FIG. 7, the storage medium 704 may include one or more of code for obtaining 730, code for communicating 732, or code for determining 734. In various implementations, the code for obtaining 730, the code for communicating 732, or the code for determining 734 may be executed or otherwise used to provide the functionality described herein for the circuit/module for obtaining 720, the circuit/module for communicating 722, or the circuit/module for determining 724.

The circuit/module for obtaining 720 may include circuitry and/or programming (e.g., code for obtaining 730 stored on the storage medium 704) adapted to perform several functions relating to, for example, obtaining an indication. In some aspects, the circuit/module for obtaining 720 (e.g., a means for obtaining) may correspond to, for example, a processing circuit as discussed herein.

In some implementations, the circuit/module for obtaining 720 obtains an indication that an interleaved symbol configuration is to be used for communicating control information between the apparatus and another apparatus. In some implementations, the circuit/module for obtaining 720 obtains an indication that an interleaved orthogonal frequency division multiplexing (OFDM) symbol configuration is to be used for communicating control information in a subframe. In either case, the circuit/module for obtaining 720 may initially determine that control information is to be communicated (e.g., based on information received or retrieved from the circuit/module for communicating 722, the memory device 708, the communication interface 702, the receiver 716, or some other component). In response, the circuit/module for obtaining 720 may determine the type of symbol configuration to be used for the communication (e.g., by receiving or retrieving information from the circuit/module for communicating 722, the memory device 708, the communication interface 702, the receiver 716, or some other component). The circuit/module for obtaining 720 then outputs a corresponding indication if an interleaved symbol configuration is to be used (e.g., to the circuit/module for communicating 722, the memory device 708, the communication interface 702, the transmitter 714, or some other component).

The circuit/module for communicating 722 may include circuitry and/or programming (e.g., code for communicating 726 stored on the storage medium 704) adapted to perform several functions relating to, for example, communicating information. In some implementations, the communication involves obtaining (e.g., receiving) the information. In some implementations, the communication involves outputting (e.g., sending or transmitting) the information.

The information may take different forms in different scenarios. In some aspects, the circuit/module for communicating 722 may communicate control information. In some aspects, the circuit/module for communicating 722 may communicate data.

The communication may use different types of signaling in different scenarios. In some aspects, the circuit/module for communicating 722 may communicate control information using contiguous interleaved symbols as a result of the circuit/module for obtaining 720 obtaining an indication. In some aspects, the circuit/module for communicating 722 may communicate data in a subframe via at least one OFDM symbol (e.g., at least one other OFDM symbol). In some aspects, the circuit/module for communicating 722 may communicate control information in a subframe based on an interleaved OFDM symbol configuration. In some aspects, the circuit/module for communicating 722 may communicate control information using a first OFDM characteristic. In some aspects, the circuit/module for communicating 722 may communicate data using a second OFDM characteristic that is different from the first OFDM characteristic.

In some implementations where the communicating involves obtaining information, the circuit/module for communicating 722 may receive information (e.g., from the communication interface 702, the receiver 716, the memory device 708, some other component of the apparatus 700, or some other device), process (e.g., decode) the information, and output the information to another component of the apparatus 700 (e.g., the memory device 708 or some other component). In some scenarios (e.g., if the circuit/module for communicating 722 includes a receiver), the communicating involves the circuit/module for communicating 722 receiving information directly from a device that transmitted the information (e.g., via radio frequency signaling or some other type of signaling suitable for the applicable communication medium).

In some implementations where the communicating involves outputting information, the circuit/module for communicating 722 obtains information (e.g., from the memory device 708 or some other component of the apparatus 700), processes (e.g., encodes) the information, and outputs the processed information. In some scenarios, the communicating involves sending the information to another component of the apparatus 700 (e.g., the transmitter 714, the communication interface 702, or some other component) that will transmit the information to another device. In some scenarios (e.g., if the circuit/module for communicating 722 includes a transmitter), the communicating involves the circuit/module for communicating 722 transmitting the information directly to another device (e.g., the ultimate destination) via radio frequency signaling or some other type of signaling suitable for the applicable communication medium.

In some aspects, the circuit/module for communicating 722 (e.g., a means for communicating) may correspond to, for example, an interface (e.g., a bus interface, a send/receive interface, or some other type of signal interface), a communication device, a transceiver, a transmitter, a receiver, or some other similar component as discussed herein. In some implementations, the communication interface 702 includes the circuit/module for communicating 722 and/or the code for communicating 726. In some implementations, the circuit/module for communicating 722 and/or the code for communicating 726 is configured to control the communication interface 702 (e.g., a transceiver, a receiver, or a transmitter) to communicate the information.

The circuit/module for determining 724 may include circuitry and/or programming (e.g., code for determining 734 stored on the storage medium 704) adapted to perform several functions relating to, for example, determining that different orthogonal frequency division multiplexing (OFDM) characteristics (e.g., numerology) are to be used for communicating control information and data. In some aspects, the circuit/module for determining 724 (e.g., a means for determining) may correspond to, for example, a processing circuit as discussed herein.

Initially, the circuit/module for determining 724 may obtain an indication that control information and data are to be communicated (e.g., from the circuit/module for communicating 722, the memory device 708, the communication interface 702, the receiver 716, or some other component). In response, the circuit/module for determining 724 may determine the type of OFDM characteristics to be used. For example, the circuit/module for determining 724 may determine the cyclic prefix length to be used for control information and the cyclic prefix length to be used for data (e.g., based on a table stored in the memory device 708). As another example, the circuit/module for determining 724 may determine the tone spacing to be used for control information and the tone spacing to be used for data. The circuit/module for determining 724 then outputs an indication of the characteristics to be used for communicating the control information and the data (e.g., to the circuit/module for communicating 722, the memory device 708, the communication interface 702, the transmitter 714, or some other component).

First Example Process

Figure 8:
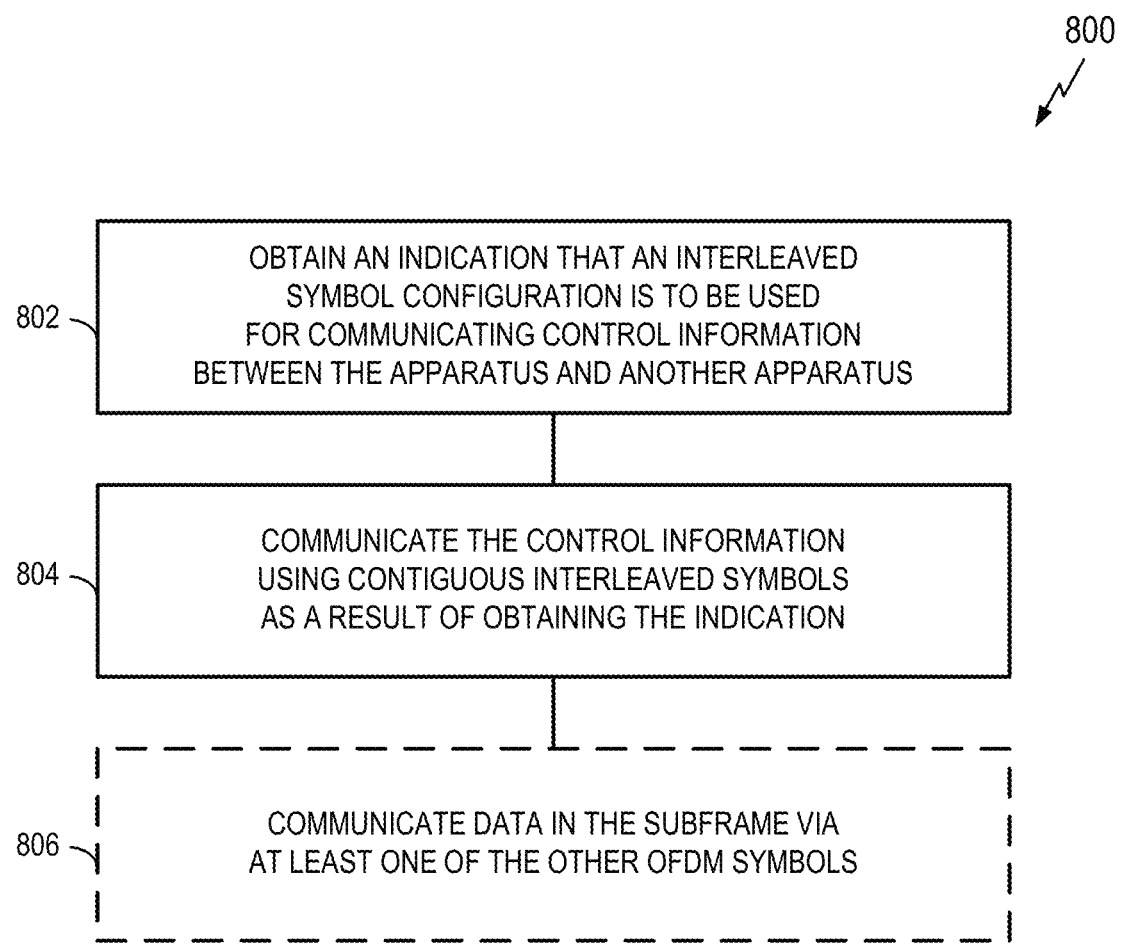
FIG. 8 is a flowchart illustrating an example of a communication process involving interleaved signaling in accordance with some aspects of the disclosure.

FIG. 8 illustrates a process 800 for communication in accordance with some aspects of the disclosure. The process 800 may take place within a processing circuit (e.g., the processing circuit 710 of FIG. 7), which may be located in a UE, an access terminal, a TRP, a base station, or some other suitable apparatus. Of course, in various aspects within the scope of the disclosure, the process 800 may be implemented by any suitable apparatus capable of supporting communication-related operations (e.g., sidelink operations).

At block 802, an apparatus (e.g., a UE) obtains an indication that an interleaved symbol configuration is to be used for communicating control information between the apparatus and another apparatus. In some aspects, the control information may include request-to-send (RTS) and clear-to-send (CTS) signaling.

The apparatus may obtain the indication in various ways. In some aspects, the obtaining of the indication may include the apparatus receiving the indication from a network entity. In some aspects, the apparatus may receive the indication via a radio resource control message. In some aspects, the apparatus may receive the indication via a PDCCH. In some aspects, the apparatus may obtain the indication from a memory.

In some aspects, the contiguous interleaved symbols may include contiguous orthogonal frequency division multiplexing (OFDM) symbols in a subframe; and each of the contiguous OFDM symbols may have a reduced symbol period relative to other OFDM symbols in the subframe.

In some aspects, a first symbol and a second symbol of the contiguous interleaved symbols may be for communication of a first message of the control information; and a third symbol and a fourth symbol of the contiguous interleaved symbols may be for communication of a second message of the control information. In some aspects, a duration of the second symbol may serve as a period of time for processing the first symbol, and a duration of the fourth symbol may serve as a period of time for processing the third symbol.

In some aspects, a fifth symbol and a sixth symbol of the contiguous interleaved symbols may be for communication of a third message of the control information. In some aspects, a duration of the fourth symbol may serve as a turn-around time between transmission of the third symbol and reception of a fifth symbol. In some aspects, the first message may be a request-to-send (RTS) by the apparatus; the second message may be a request-to-send (RTS) by the other apparatus; and the third message may be a clear-to-send (CTS) by the apparatus or the other apparatus. In some aspects, the first symbol, the third symbol, and the fifth symbol may constitute a first handshaking process; and the second symbol, the fourth symbol, and the sixth symbol may constitute a second handshaking process.

In some implementations, the circuit/module for obtaining 720 of FIG. 7 performs the operations of block 802. In some implementations, the code for obtaining 730 of FIG. 7 is executed to perform the operations of block 802.

At block 804, the apparatus communicates (e.g., sends and/or receives) the control information using contiguous interleaved symbols as a result of obtaining the indication.

In some implementations, the circuit/module for communicating 722 of FIG. 7 performs the operations of block 804. In some implementations, the code for communicating 732 of FIG. 7 is executed to perform the operations of block 804.

At optional block 806, the apparatus may communicate (e.g., send and/or receive) data in the subframe via at least one of the other OFDM symbols. In some aspects, contiguous OFDM symbols in the subframe may include tones that have a first tone spacing; and the other OFDM symbols in the subframe may include tones that have a second tone spacing that is shorter than the first tone spacing. In some aspects, each of contiguous OFDM symbols in the subframe may have a first cyclic prefix length; and each of the other OFDM symbols in the subframe may have a second cyclic prefix length that is longer than the first cyclic prefix length.

In some implementations, the circuit/module for communicating 722 of FIG. 7 performs the operations of block 806. In some implementations, the code for communicating 732 of FIG. 7 is executed to perform the operations of block 806.

Second Example Process

Figure 9:
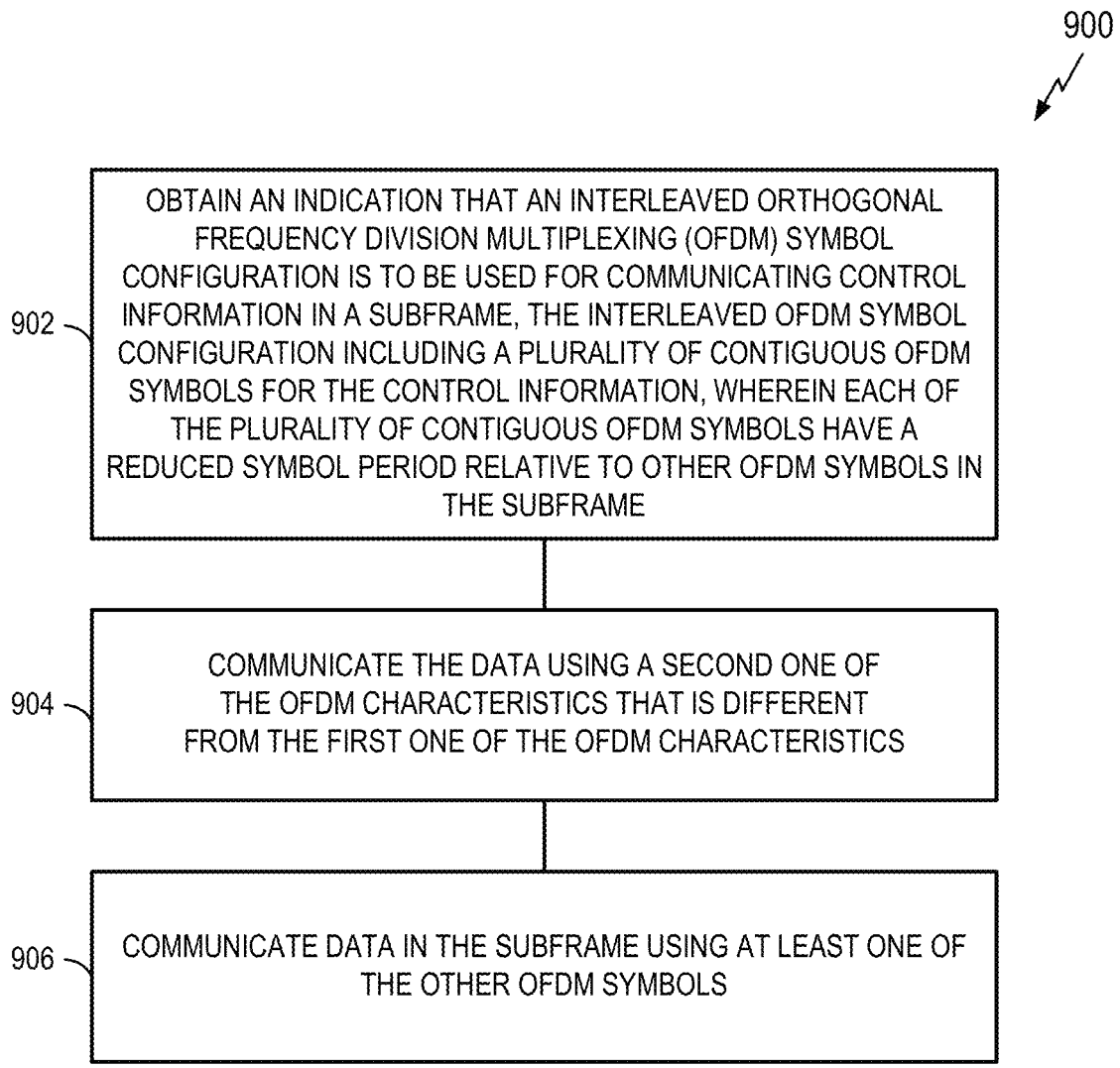
FIG. 9 is a flowchart illustrating another example of a communication process involving interleaved signaling in accordance with some aspects of the disclosure.

FIG. 9 illustrates a process 900 for communication in accordance with some aspects of the disclosure. The process 900 may take place within a processing circuit (e.g., the processing circuit 710 of FIG. 7), which may be located in a UE, an access terminal, a TRP, a base station, or some other suitable apparatus. Of course, in various aspects within the scope of the disclosure, the process 900 may be implemented by any suitable apparatus capable of supporting communication-related operations (e.g., sidelink operations).

At block 902, an apparatus (e.g., a UE) obtains an indication that an interleaved orthogonal frequency division multiplexing (OFDM) symbol configuration is to be used for communicating control information in a subframe, the interleaved OFDM symbol configuration including a plurality of contiguous OFDM symbols for the control information, wherein each of the plurality of contiguous OFDM symbols has a reduced symbol period relative to other OFDM symbols in the subframe.

In some aspects, the control information includes request-to-send (RTS) and clear-to-send (CTS) signaling. In some aspects, a first set of OFDM symbols of the plurality of contiguous OFDM symbols are for communicating the control information between a first group of UEs, and a second set of OFDM symbols of the plurality of contiguous OFDM symbols are for communicating the control information between a second group of UEs, the first set of OFDM symbols being interleaved with the second set of OFDM symbols. For example, with reference to FIG. 5, the first set of OFDM symbols may include the short symbols 504, 508, and 512, and the second set of OFDM symbols may include the short symbols 506, 510, and 514. In some aspects, the indication identifies the first set of OFDM symbols or the second set of OFDM symbols to be used for communicating the control information. In some aspects, a duration of at least one of the second set of OFDM symbols serves as a processing period for a communication between the first group of UEs, and a duration of at least one of the first set of OFDM symbols serves as a processing period for a communication between the second group of UEs.

In some aspects, the plurality of contiguous OFDM symbols includes at least two sets of OFDM symbols, each set of the at least two sets of OFDM symbols configured for communication of the control information between a different group of user equipments (UEs), and wherein the at least two sets of OFDM symbols are interleaved in the plurality of contiguous OFDM symbols. In some aspects, the indication identifies one of the at least two sets of OFDM symbols to be used for communicating the control information.

In some aspects, the plurality of contiguous OFDM symbols for the control information include tones having a first tone spacing, and the other OFDM symbols in the subframe include tones having a second tone spacing. In some aspects, each of the plurality of contiguous OFDM symbols for the control information may include a first cyclic prefix length, and each of the other OFDM symbols may include a second cyclic prefix length that is longer than the first cyclic prefix length.

In some aspects, the indication is received from a network entity. In some aspects, the indication may include a radio resource control message. In some aspects, the indication may include a PDCCH. In some aspects, the indication is stored in a memory.

In some implementations, the circuit/module for obtaining 720 of FIG. 7 performs the operations of block 902. In some implementations, the code for obtaining 730 of FIG. 7 is executed to perform the operations of block 902.

At block 904, the apparatus communicates (e.g., sends or receives) the control information in the subframe based on the interleaved OFDM symbol configuration.

In some implementations, the circuit/module for communicating 722 of FIG. 7 performs the operations of block 904. In some implementations, the code for communicating 732 of FIG. 7 is executed to perform the operations of block 904.

At block 906, the apparatus communicates (e.g., sends or receives) data in the subframe using at least one of the other OFDM symbols.

In some implementations, the circuit/module for communicating 722 of FIG. 7 performs the operations of block 906. In some implementations, the code for communicating 732 of FIG. 7 is executed to perform the operations of block 906.

Third Example Process

Figure 10:
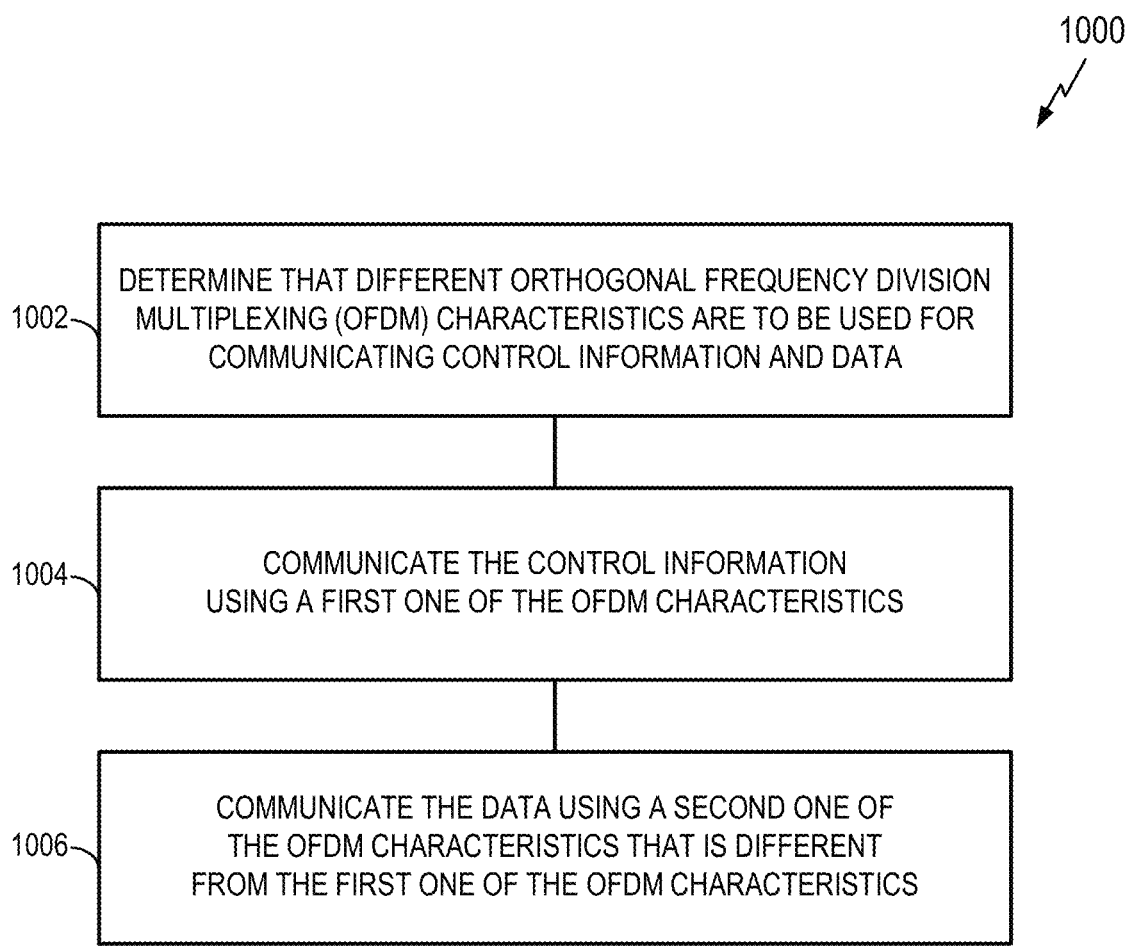
FIG. 10 is a flowchart illustrating an example of a communication process involving different numerologies in accordance with some aspects of the disclosure.

FIG. 10 illustrates a process 1000 for communication in accordance with some aspects of the disclosure. The process 1000 may take place within a processing circuit (e.g., the processing circuit 8710 of FIG. 7), which may be located in a UE, an access terminal, a TRP, a base station, or some other suitable apparatus. Of course, in various aspects within the scope of the disclosure, the process 1000 may be implemented by any suitable apparatus capable of supporting communication-related operations (e.g., sidelink operations).

At block 1002, an apparatus (e.g., a UE) determines that different orthogonal frequency division multiplexing (OFDM) characteristics (e.g., numerology) are to be used for communicating control information and data.

This determination may be based on different factors in different implementations. In some aspects, the determination is based on a quantity of resources used for sidelink communication. In some aspects, the determination is based on a quantity of user equipment that use sidelink communication. In some aspects, the determination is based on a modulation and coding scheme (MCS) used for sidelink communication. In some aspects, the determination is based on a received indication. In some aspects, the indication may be a radio resource control message. In some aspects, the indication may be a physical downlink control channel (PDCCH).

In some aspects, the OFDM characteristics may include tone spacings. For example, the first one of the OFDM characteristics may include a first tone spacing, and the second one of the OFDM characteristics may include a second tone spacing that is smaller than the first tone spacing.

In some aspects, the OFDM characteristics may include cyclic prefix lengths. For example, the first one of the OFDM characteristics may include a first cyclic prefix length, and the second one of the OFDM characteristics may include a second cyclic prefix length that is longer than the first cyclic prefix length.

In some implementations, the circuit/module for determining 724 of FIG. 7 performs the operations of block 1002. In some implementations, the code for determining 734 of FIG. 7 is executed to perform the operations of block 1002.

At block 1004, the apparatus communicates (e.g., sends or receives) the control information using a first one of the OFDM characteristics. In some aspects, the control information may include request-to-send (RTS) and clear-to-send (CTS) signaling.

In some implementations, the circuit/module for communicating 722 of FIG. 7 performs the operations of block 1004. In some implementations, the code for communicating 732 of FIG. 7 is executed to perform the operations of block 1004.

At block 1006, the apparatus communicates (e.g., sends or receives) the data using a second one of the OFDM characteristics that is different from the first one of the OFDM characteristics. In some aspects, the control information and the data may be communicated via a single sub-frame.

In some implementations, the circuit/module for communicating 722 of FIG. 7 performs the operations of block 1006. In some implementations, the code for communicating 732 of FIG. 7 is executed to perform the operations of block 1006.

In some aspects, a process in accordance with the teachings herein may include any combination of the operations of FIGS. 8, 9, and 10.

Second Example Apparatus

Figure 11:
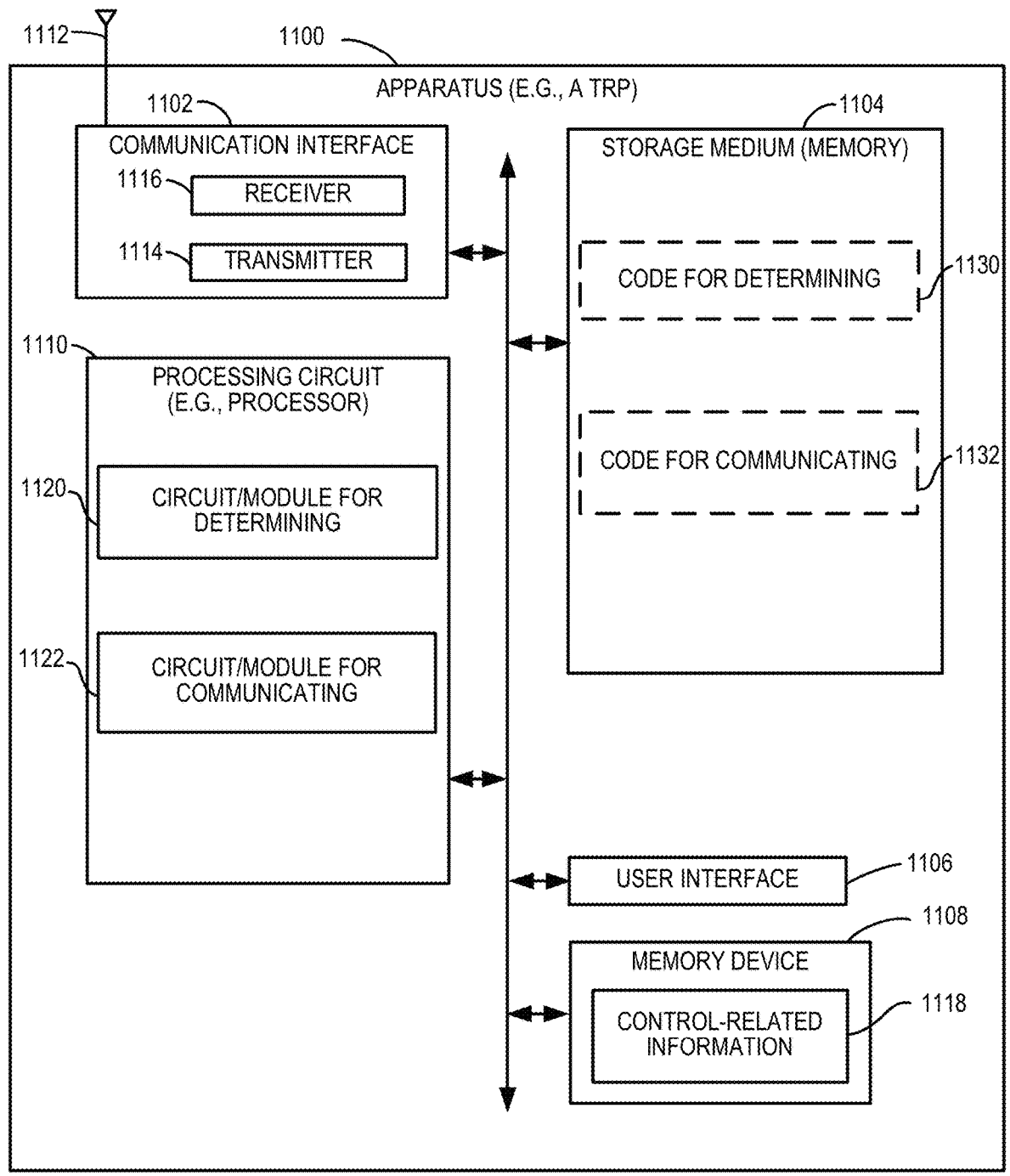
FIG. 11 is a block diagram illustrating another example hardware implementation for an apparatus (e.g., an electronic device) that can support interleaved signaling and/or different numerologies in accordance with some aspects of the disclosure.

FIG. 11 illustrates a block diagram of an example hardware implementation of an apparatus 1100 configured to communicate (e.g., using interleaving) according to one or more aspects of the disclosure. The apparatus 1100 could embody or be implemented within a transmit receive point (TRP), an access point, a UE, or some other type of device that supports wireless communication (e.g., with adaptive frame characteristics) as taught herein. In various implementations, the apparatus 1100 could embody or be implemented within a base station, an access terminal, or some other type of device. In various implementations, the apparatus 1100 could embody or be implemented within a server, a network entity, a mobile phone, a smart phone, a tablet, a portable computer, a personal computer, a sensor, an alarm, a vehicle, a machine, an entertainment device, a medical device, or any other electronic device having circuitry.

The apparatus 1100 includes a communication interface 1102 (e.g., at least one transceiver), a storage medium 1104, a user interface 1106, a memory device 1108 (e.g., storing control-related information 1118), and a processing circuit 1110 (e.g., at least one processor). In various implementations, the user interface 1106 may include one or more of: a keypad, a display, a speaker, a microphone, a touchscreen display, of some other circuitry for receiving an input from or sending an output to a user. The communication interface 1102 may be coupled to one or more antennas 1112, and may include a transmitter 1114 and a receiver 1116. In general, the components of FIG. 11 may be similar to corresponding components of the apparatus 700 of FIG. 7.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1-6, 12, and 13. As used herein, the term "adapted" in relation to the processing circuit 1110 may refer to the processing circuit 1110 being one or more of configured, used, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described in conjunction with FIGS. 1-6, 12, and 13. The processing circuit 1110 may serve as one example of a means for transmitting and/or a means for receiving. In various implementations, the processing circuit 1110 may, at least in part, incorporate the functionality of the TRP 202 (e.g., the interleaved RTS/CTS signaling management 214) of FIG. 2.

According to at least one example of the apparatus 1100, the processing circuit 1110 may include one or more of a circuit/module for determining 1120 or a circuit/module for communicating 1122. In various implementations, the circuit/module for determining 1120 or the circuit/module for communicating 1122 may correspond, at least in part, to the functionality of the TRP 202 (e.g., the interleaved RTS/CTS signaling management 214) of FIG. 2.

As mentioned above, programming stored by the storage medium 1104, when executed by the processing circuit 1110, causes the processing circuit 1110 to perform one or more of the various functions and/or process operations described herein. For example, the programming may cause the processing circuit 1110 to perform the various functions, steps, and/or processes described herein with respect to FIGS. 1-6, 12, and 13 in various implementations. As shown in FIG. 11, the storage medium 1104 may include one or more of code for determining 1130 or code for communicating 1132. In various implementations, the code for determining 1130 or the code for communicating 1132 may be executed or otherwise used to provide the functionality described herein for the circuit/module for determining 1120 or the circuit/module for communicating 1122.

The circuit/module for determining 1120 may include circuitry and/or programming (e.g., code for determining 1130 stored on the storage medium 1104) adapted to perform several functions relating to, for example, determining that an interleaved symbol configuration is to be used. In some aspects, the circuit/module for determining 1120 (e.g., a means for determining) may correspond to, for example, a processing circuit as discussed herein.

In some implementations, the circuit/module for determining 1120 determines that an interleaved symbol configuration is to be used for communicating control information between a first apparatus and a second apparatus. In some implementations, the circuit/module for determining 1120 determines that an interleaved OFDM symbol configuration is to be used by one or more UEs for communication of control information in a subframe. In either case, the circuit/module for determining 1120 may initially determine that control information is to be communicated (e.g., by receiving or retrieving corresponding information from the circuit/module for communicating 1122, the memory device 1108, the communication interface 1102, the receiver 1116, or some other component). In response, the circuit/module for determining 1120 may determine the type of symbol configuration to be used. In some aspects, the determination may be based on a quantity of resources allocated for sidelink communication, a quantity of apparatuses that use sidelink communication, on at least one modulation and coding scheme (MCS) used for sidelink communication, or any combination thereof. For example, a scheduler may determine that an interleaved symbol configuration is to be used for sidelink communication (e.g., always or under in certain circumstances). Such circumstances could include, for example, situations where overhead needs to reduced or be kept as low as possible. The circuit/module for determining 1120 then outputs an indication of the interleaved symbol configuration (e.g., to the circuit/module for communicating 1122, the memory device 1108, the communication interface 1102, the transmitter 1114, or some other component).

The circuit/module for communicating 1122 may include circuitry and/or programming (e.g., code for communicating 1126 stored on the storage medium 1104) adapted to perform several functions relating to, for example, communicating information. In some implementations, the communication involves obtaining (e.g., receiving) the information. In some implementations, the communication involves outputting (e.g., sending or transmitting) the information.

The information may take different forms in different scenarios. In some aspects, the circuit/module for communicating 1122 may communicate an indication as a result of a determination by the circuit/module for determining 1120. Here, the indication may indicate that the interleaved symbol configuration is to be used for communicating control information between the first apparatus and the second apparatus. In some aspects, the circuit/module for communicating 1122 may communicate an indication that an interleaved OFDM symbol configuration is to be used to the one or more UEs. In some aspects, the circuit/module for communicating 1122 may communicate a message (e.g., including control information and/or other information).

In some implementations where the communicating involves obtaining information, the circuit/module for communicating 1122 may receive information (e.g., from the communication interface 1102, the receiver 1116, the memory device 1108, some other component of the apparatus 1100, or some other device), process (e.g., decode) the information, and output the information to another component of the apparatus 1100 (e.g., the memory device 1108 or some other component). In some scenarios (e.g., if the circuit/module for communicating 1122 includes a receiver), the communicating involves the circuit/module for communicating 1122 receiving information directly from a device that transmitted the information (e.g., via radio frequency signaling or some other type of signaling suitable for the applicable communication medium).

In some implementations where the communicating involves outputting information, the circuit/module for communicating 1122 may obtain information (e.g., from the memory device 1108 or some other component of the apparatus 1100), process (e.g., encode) the information, and output the processed information. In some scenarios, the communicating involves sending the information to another component of the apparatus 1100 (e.g., the transmitter 1114, the communication interface 1102, or some other component) that will transmit the information to another device. In some scenarios (e.g., if the circuit/module for communicating 1122 includes a transmitter), the communicating involves the circuit/module for communicating 1122 transmitting the information directly to another device (e.g., the ultimate destination) via radio frequency signaling or some other type of signaling suitable for the applicable communication medium.

In some aspects, the circuit/module for communicating 1122 (e.g., a means for communicating) may correspond to, for example, an interface (e.g., a bus interface, a send/receive interface, or some other type of signal interface), a communication device, a transceiver, a transmitter, a receiver, or some other similar component as discussed herein. In some implementations, the communication interface 1102 includes the circuit/module for communicating 1122 and/or the code for communicating 1126. In some implementations, the circuit/module for communicating 1122 and/or the code for communicating 1126 is configured to control the communication interface 1102 (e.g., a transceiver, a receiver, or a transmitter) to communicate the information.

Fourth Example Process

Figure 12:
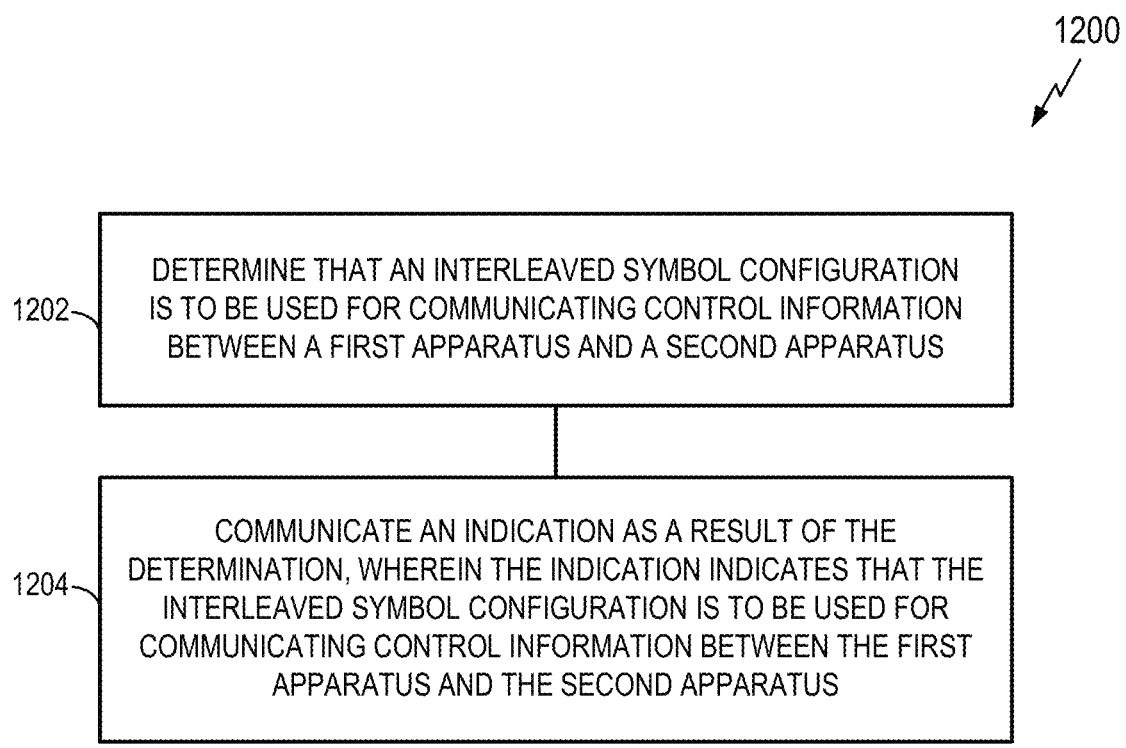
FIG. 12 is a flowchart illustrating an example of a communication process involving interleaved signaling in accordance with some aspects of the disclosure.

FIG. 12 illustrates a process 1200 for communication in accordance with some aspects of the disclosure. The process 1200 may take place within a processing circuit (e.g., the processing circuit 1110 of FIG. 11), which may be located in a TRP, a base station, a UE, an access terminal, or some other suitable apparatus. Of course, in various aspects within the scope of the disclosure, the process 1200 may be implemented by any suitable apparatus capable of supporting communication-related operations (e.g., sidelink operations).

At block 1202, an apparatus (e.g., a TRP) determines that an interleaved symbol configuration is to be used for communicating control information between a first apparatus and a second apparatus (e.g., a pair of UEs). In some aspects, the control information may include request-to-send (RTS) and clear-to-send (CTS) signaling.

The determination of block 1202 may be based on different factors in different implementations. In some aspects, the determination is based on a quantity of resources allocated for sidelink communication. In some aspects, the determination is based on a quantity of apparatuses (e.g., UEs) that use sidelink communication. In some aspects, the determination is based on at least one modulation and coding scheme (MCS) used for sidelink communication.

In some implementations, the circuit/module for determining 1120 of FIG. 11 performs the operations of block 1202. In some implementations, the code for determining 1130 of FIG. 11 is executed to perform the operations of block 1202.

At block 1204, the apparatus communicates (e.g., sends) an indication as a result of the determination. In some aspects, the indication may indicate that the interleaved symbol configuration is to be used for communicating control information between the first apparatus and the second apparatus. In some aspects, the indication may be communicated via a radio resource control message or a physical downlink control channel (PDCCH).

In some aspects, the indication may indicate that: contiguous orthogonal frequency division multiplexing (OFDM) symbols in a subframe are to be used for communicating the control information; and each of the contiguous OFDM symbols have a reduced symbol period relative to other OFDM symbols in the subframe. In some aspects, the contiguous OFDM symbols in the subframe may include tones having a first tone spacing; and the other OFDM symbols in the subframe may include tones having a second tone spacing that is shorter than the first tone spacing. In some aspects, each of the contiguous OFDM symbols in the subframe may include a first cyclic prefix length; and each of the other OFDM symbols in the subframe may include a second cyclic prefix length that is longer than the first cyclic prefix length.

In some aspects, a first symbol and a second symbol of the contiguous OFDM symbols may be for communication of a first message of the control information; a third symbol and a fourth symbol of the contiguous OFDM symbols may be for communication of a second message of the control information; and a fifth symbol and a sixth symbol of the contiguous OFDM symbols may be for communication of a third message of the control information. In some aspects, a duration of the second symbol may serve as a period of time for processing the first symbol, and a duration of the fourth symbol may serve as a period of time for processing the third symbol. In some aspects, a duration of the fourth symbol may serve as a turn-around time between transmission of the third symbol and reception of the fifth symbol. In some aspects, the first message may be a request-to-send (RTS) by the apparatus; the second message may be a request-to-send (RTS) by the other apparatus; and the third message may be a clear-to-send (CTS) by the apparatus or the other apparatus. In some aspects, the first symbol, the third symbol, and the fifth symbol may constitute a first handshaking process; and the second symbol, the fourth symbol, and the sixth symbol may constitute a second handshaking process.

In some implementations, the circuit/module for communicating 1122 of FIG. 11 performs the operations of block 1204. In some implementations, the code for communicating 1132 of FIG. 11 is executed to perform the operations of block 1204.

Fifth Example Process

Figure 13:
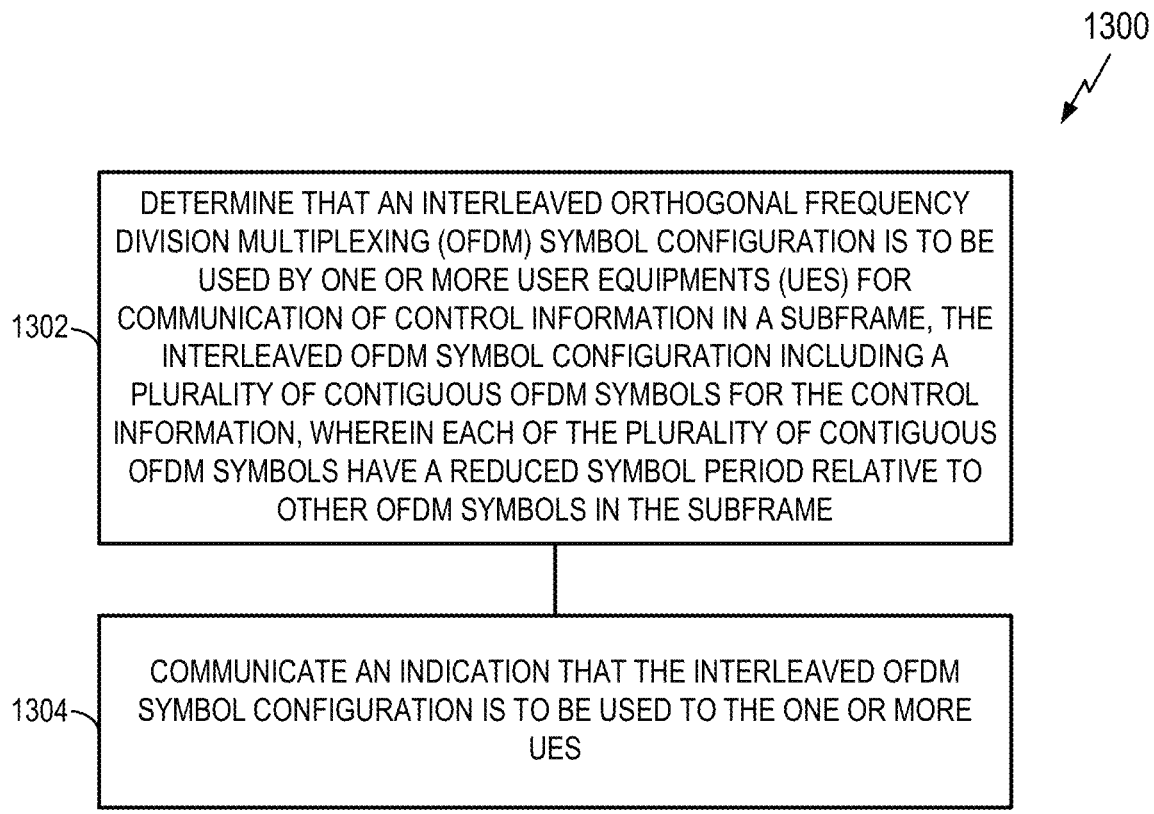
FIG. 13 is a flowchart illustrating another example of a communication process involving interleaved signaling in accordance with some aspects of the disclosure.

FIG. 13 illustrates a process 1300 for communication in accordance with some aspects of the disclosure. The process 1300 may take place within a processing circuit (e.g., the processing circuit 1110 of FIG. 11), which may be located in a TRP, a base station, a UE, an access terminal, or some other suitable apparatus. Of course, in various aspects within the scope of the disclosure, the process 1300 may be implemented by any suitable apparatus capable of supporting communication-related operations (e.g., sidelink operations).

At block 1302, an apparatus (e.g., a TRP) determines that an interleaved OFDM symbol configuration is to be used by one or more UEs for communication of control information in a subframe, the interleaved OFDM symbol configuration including a plurality of contiguous OFDM symbols for the control information, wherein each of the plurality of contiguous OFDM symbols has a reduced symbol period relative to other OFDM symbols in the subframe.

This determination may be based on different factors in different implementations. In some aspects, the determination is based on a quantity of resources used for sidelink communication. In some aspects, the determination is based on a quantity of UEs that use sidelink communication. In some aspects, the determination is based on a modulation and coding scheme (MCS) used for sidelink communication.

In some aspects, the control information may include request-to-send (RTS) and clear-to-send (CTS) signaling. In some aspects, at least one of the other OFDM symbols are to be used by the one or more UEs for communication of data. In some aspects, a first set of OFDM symbols of the plurality of contiguous OFDM symbols are for communicating the control information between a first group of UEs, and a second set of OFDM symbols of the plurality of contiguous OFDM symbols are for communicating the control information between a second group of UEs, the first set of OFDM symbols being interleaved with the second set of OFDM symbols. In some aspects, a duration of at least one of the second set of OFDM symbols serves as a processing period for a communication between the first group of UEs, and a duration of at least one of the first set of OFDM symbols serves as a processing period for a communication between the second group of UEs.

In some aspects, the plurality of contiguous OFDM symbols includes at least two sets of OFDM symbols, each set of the at least two sets of OFDM symbols configured for communication of the control information between a different group of UEs, and wherein the at least two sets of OFDM symbols are interleaved in the plurality of contiguous OFDM symbols.

In some aspects, the plurality of contiguous OFDM symbols for the control information include tones having a first tone spacing, and the other OFDM symbols in the subframe include tones having a second tone spacing. In some aspects, each of the plurality of contiguous OFDM symbols for the control information may include a first cyclic prefix length, and each of the other OFDM symbols may include a second cyclic prefix length that is longer than the first cyclic prefix length.

In some implementations, the circuit/module for determining 1120 of FIG. 11 performs the operations of block 1302. In some implementations, the code for determining 1130 of FIG. 11 is executed to perform the operations of block 1302.

At block 1304, the apparatus communicates (e.g., sends or receives) an indication that the interleaved OFDM symbol configuration is to be used to the one or more UEs. In some aspects, the indication may be a radio resource control message. In some aspects, the indication may be a physical downlink control channel (PDCCH). In some aspects, the indication identifies the first set of OFDM symbols or the second set of OFDM symbols to be used for communication of the control information. In some aspects, the indication identifies one of the at least two sets of OFDM symbols to be used for communication of the control information.

In some implementations, the circuit/module for communicating 1122 of FIG. 11 performs the operations of block 1304. In some implementations, the code for communicating 1132 of FIG. 11 is executed to perform the operations of block 1304.

In some aspects, a process in accordance with the teachings herein may include any combination of the operations of FIGS. 12 and 13.

Additional Aspects

In some aspects, the disclosure provides an apparatus configured for communication. The apparatus including: means for obtaining an indication that an interleaved orthogonal frequency division multiplexing (OFDM) symbol configuration is to be used for communicating control information in a subframe, the interleaved OFDM symbol configuration including a plurality of contiguous OFDM symbols for the control information, wherein each of the plurality of contiguous OFDM symbols has a reduced symbol period relative to other OFDM symbols in the subframe; and means for communicating the control information in the subframe based on the interleaved OFDM symbol configuration.

Another aspect of the disclosure provides a non-transitory computer-readable medium storing computer-executable code, including code to: obtain an indication that an interleaved orthogonal frequency division multiplexing (OFDM) symbol configuration is to be used for communicating control information in a subframe, the interleaved OFDM symbol configuration including a plurality of contiguous OFDM symbols for the control information, wherein each of the plurality of contiguous OFDM symbols has a reduced symbol period relative to other OFDM symbols in the subframe; and communicate the control information in the subframe based on the interleaved OFDM symbol configuration.

Another aspect of the disclosure provides an apparatus configured for communication. The apparatus including: means for determining that an interleaved orthogonal frequency division multiplexing (OFDM) symbol configuration is to be used by one or more user equipments (UEs) for communication of control information in a subframe, the interleaved OFDM symbol configuration including a plurality of contiguous OFDM symbols for the control information, wherein each of the plurality of contiguous OFDM symbols has a reduced symbol period relative to other OFDM symbols in the subframe; and means for communicating an indication that the interleaved OFDM symbol configuration is to be used to the one or more UEs.

Another aspect of the disclosure provides a non-transitory computer-readable medium storing computer-executable code, including code to: determine that an interleaved orthogonal frequency division multiplexing (OFDM) symbol configuration is to be used by one or more user equipments (UEs) for communication of control information in a subframe, the interleaved OFDM symbol configuration including a plurality of contiguous OFDM symbols for the control information, wherein each of the plurality of contiguous OFDM symbols has a reduced symbol period relative to other OFDM symbols in the subframe; and communicate an indication that the interleaved OFDM symbol configuration is to be used to the one or more UEs.

Aspects of the present disclosure provide for a method, apparatus, and/or computer-readable medium for determining that different OFDM characteristics are to be used for communicating control information and data, communicating the control information using a first one of the OFDM characteristics, and communicating the data using a second one of the OFDM characteristics that is different from the first one of the OFDM characteristics.

In an aspect of the disclosure, the control information may include RTS and CTS signaling. In an aspect of the disclosure, the control information and the data are communicated via a single sub-frame, wherein the OFDM characteristics comprise tone spacings. In an aspect of the disclosure, the first one of the OFDM characteristics may include a first tone spacing, and the second one of the OFDM characteristics may include a second tone spacing that is smaller than the first tone spacing. In an aspect of the disclosure, the OFDM characteristics comprise cyclic prefix lengths. For example, the first one of the OFDM characteristics may include a first cyclic prefix length, and the second one of the OFDM characteristics may include a second cyclic prefix length that is longer than the first cyclic prefix length.

In an aspect of the disclosure, the determination is based on a quantity of resources used for sidelink communication. In an aspect of the disclosure, the determination is based on a quantity of user equipment that use sidelink communication. In an aspect of the disclosure, the determination is based on a modulation and coding scheme (MCS) used for sidelink communication. In an aspect of the disclosure, the determination is based on a received indication. In an aspect of the disclosure, the indication may include a radio resource control message. In an aspect of the disclosure, the indication may include a PDCCH.

In an aspect of the disclosure, an apparatus for communication includes a memory and a processor coupled to the memory. The processor and the memory configured to determine that different OFDM characteristics are to be used for communicating control information and data, communicate the control information using a first one of the OFDM characteristics, and communicate the data using a second one of the OFDM characteristics that is different from the first one of the OFDM characteristics.

In an aspect of the disclosure, an apparatus for communication includes means for determining that different OFDM characteristics are to be used for communicating control information and data and means for communicating the control information using a first one of the OFDM characteristics, wherein the means for communicating is configured to communicate the data using a second one of the OFDM characteristics that is different from the first one of the OFDM characteristics.

In an aspect of the disclosure, a non-transitory computer-readable medium storing computer-executable code is provided. The non-transitory computer-readable medium is configured to determine that different OFDM characteristics are to be used for communicating control information and data, communicate the control information using a first one of the OFDM characteristics, and communicate the data using a second one of the OFDM characteristics that is different from the first one of the OFDM characteristics.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
    obtaining an indication that an interleaved symbol configuration is to be used for communicating control information between the apparatus and another apparatus; and
    communicating the control information using contiguous interleaved symbols as a result of obtaining the indication, wherein a first symbol, a third symbol, and a fifth symbol of the contiguous interleaved symbols constitute a first handshaking process and a second symbol, a fourth symbol, and a sixth symbol of the contiguous interleaved symbols constitute a second handshaking process, and wherein a duration of the fourth symbol serves as a turn-around time between transmission of the third symbol and reception of the fifth symbol, and wherein a duration of the second symbol serves as a period of time for processing the first symbol, and the duration of the fourth symbol serves as a period of time for processing the third symbol.

2. The method of claim 1, wherein the control information comprises request-to-send (RTS) and clear-to-send (CTS) signaling.

3. The method of claim 1, wherein:
    the contiguous interleaved symbols comprise contiguous orthogonal frequency division multiplexing (OFDM) symbols in a subframe; and
    each of the contiguous OFDM symbols has a reduced symbol period relative to other OFDM symbols in the subframe.

4. The method of claim 3, further comprising:
    communicating data in the subframe via at least one of the other OFDM symbols.

5. The method of claim 4, wherein:
    the contiguous OFDM symbols in the subframe comprise tones having a first tone spacing; and
    the other OFDM symbols in the subframe comprise tones having a second tone spacing that is shorter than the first tone spacing.

6. The method of claim 4, wherein:
    each of the contiguous OFDM symbols in the subframe comprises a first cyclic prefix length; and
    each of the other OFDM symbols in the subframe comprises a second cyclic prefix length that is longer than the first cyclic prefix length.

7. The method of claim 1, wherein:
    the first symbol and the second symbol of the contiguous interleaved symbols are for communication of a first message of the control information; and
    the third symbol and the fourth symbol of the contiguous interleaved symbols are for communication of a second message of the control information.

8. The method of claim 7, wherein the fifth symbol and the sixth symbol of the contiguous interleaved symbols are for communication of a third message of the control information.

9. The method of claim 8, wherein:
    the first message is a request-to-send (RTS) by the apparatus;
    the second message is a request-to-send (RTS) by the other apparatus; and
    the third message is a clear-to-send (CTS) by the apparatus or the other apparatus.

10. The method of claim 1, wherein the obtaining of the indication comprises receiving the indication from a network entity.

11. The method of claim 10, wherein the indication is received via a radio resource control message or a physical downlink control channel (PDCCH).

12. The method of claim 1, wherein:
    the first symbol and the second symbol of the contiguous interleaved symbols comprise a request-to-send (RTS) by the apparatus;
    the third symbol and the fourth symbol of the contiguous interleaved symbols comprise a request-to-send (RTS) by the other apparatus; and
    the fifth symbol and the sixth symbol of the contiguous interleaved symbols comprise a clear-to-send (CTS) by the apparatus or the other apparatus.

13. An apparatus for communication, comprising:
    a memory; and
    a processor coupled to the memory,
    the processor and the memory configured to:
        obtain an indication that an interleaved symbol configuration is to be used for communicating control information between the apparatus and another apparatus; and
        communicate the control information using contiguous interleaved symbols as a result of obtaining the indication, wherein a first symbol, a third symbol, and a fifth symbol of the contiguous interleaved symbols constitute a first handshaking process and a second symbol, a fourth symbol, and a sixth symbol of the contiguous interleaved symbols constitute a second handshaking process, and wherein a duration of the fourth symbol serves as a turn-around time between transmission of the third symbol and reception of the fifth symbol, and wherein a duration of the second symbol serves as a period of time for processing the first symbol, and the duration of the fourth symbol serves as a period of time for processing the third symbol.

14. A method of communication, comprising:
determining that a contiguous interleaved symbol configuration is to be used for communicating control information between a first apparatus and a second apparatus; and
communicating an indication as a result of the determination, wherein the indication indicates that the interleaved symbol configuration is to be used for communicating the control information between the first apparatus and the second apparatus, wherein a first symbol, a third symbol, and a fifth symbol of the contiguous interleaved symbol configuration constitute a first handshaking process and a second symbol, a fourth symbol, and a sixth symbol of the contiguous interleaved symbol configuration constitute a second handshaking process, and wherein a duration of the fourth symbol serves as a turn-around time between transmission of the third symbol and reception of the fifth symbol, and wherein a duration of the second symbol serves as a period of time for processing the first symbol, and the duration of the fourth symbol serves as a period of time for processing the third symbol.

15. The method of claim 14, wherein the control information comprises request-to-send (RTS) and clear-to-send (CTS) signaling.

16. The method of claim 14, wherein the determination is based on a quantity of resources allocated for sidelink communication.

17. The method of claim 14, wherein the determination is based on a quantity of apparatuses that use sidelink communication.

18. The method of claim 14, wherein the determination is based on at least one modulation and coding scheme (MCS) used for sidelink communication.

19. The method of claim 14, wherein the indication further indicates that:
contiguous orthogonal frequency division multiplexing (OFDM) symbols in a subframe are to be used for communicating the control information; and
each of the contiguous OFDM symbols has a reduced symbol period relative to other OFDM symbols in the subframe.

20. The method of claim 19, wherein:
the contiguous OFDM symbols in the subframe comprise tones having a first tone spacing; and
the other OFDM symbols in the subframe comprise tones having a second tone spacing that is shorter than the first tone spacing.

21. The method of claim 19, wherein:
each of the contiguous OFDM symbols in the subframe comprises a first cyclic prefix length; and
each of the other OFDM symbols in the subframe comprises a second cyclic prefix length that is longer than the first cyclic prefix length.

22. The method of claim 14, wherein:
the first symbol and the second symbol of the contiguous interleaved symbol configuration are for communication of a first message of the control information;
the third symbol and the fourth symbol of the contiguous interleaved symbol configuration are for communication of a second message of the control information; and
the fifth symbol and the sixth symbol of the contiguous interleaved symbol configuration are for communication of a third message of the control information.

23. The method of claim 22, wherein:
the first message is a request-to-send (RTS) by the first apparatus;
the second message is a request-to-send (RTS) by the second apparatus; and
the third message is a clear-to-send (CTS) by the first apparatus or the second apparatus.

24. The method of claim 14, wherein the indication is communicated via a radio resource control message or a physical downlink control channel (PDCCH).

25. The method of claim 14, wherein:
the first symbol and the second symbol of the contiguous interleaved symbol configuration comprise a request-to-send (RTS) by the first apparatus;
the third symbol and the fourth symbol of the contiguous interleaved symbol configuration comprise a request-to-send (RTS) by the second apparatus; and
the fifth symbol and the sixth symbol of the contiguous interleaved symbol configuration comprise a clear-to-send (CTS) by the first apparatus or the second apparatus.

26. An apparatus for communication, comprising:
a memory; and
a processor coupled to the memory,
the processor and the memory configured to:
determine that a contiguous interleaved symbol configuration is to be used for communicating control information between a first apparatus and a second apparatus; and
communicate an indication as a result of the determination, wherein the indication indicates that the interleaved symbol configuration is to be used for communicating the control information between the first apparatus and the second apparatus, wherein a first symbol, a third symbol, and a fifth symbol of the contiguous interleaved symbol configuration constitute a first handshaking process and a second symbol, a fourth symbol, and a sixth symbol of the contiguous interleaved symbol configuration constitute a second handshaking process, and wherein a duration of the fourth symbol serves as a turn-around time between transmission of the third symbol and reception of the fifth symbol, and wherein a duration of the second symbol serves as a period of time for processing the first symbol, and the duration of the fourth symbol serves as a period of time for processing the third symbol.

* * * * *